(12) United States Patent
Kadowaki et al.

(10) Patent No.: US 11,442,294 B2
(45) Date of Patent: Sep. 13, 2022

(54) TRANSMISSIVE POLARIZATION CONTROL DEVICE, OPTICAL ISOLATOR, POLARIZATION VARIABLE LIGHT SOURCE, AND METHOD OF MANUFACTURING TRANSMISSIVE POLARIZATION CONTROL DEVICE

(71) Applicant: NICHIA CORPORATION, Anan (JP)

(72) Inventors: Takuya Kadowaki, Yokohama (JP);
Motoichi Ohtsu, Shinagawa-ku (JP);
Tadashi Kawazoe, Atsugi (JP)

(73) Assignee: NICHIA CORPORATION, Anan (JP)

( * ) Notice: Subject to any disclaimer, the term of this patent is extended or adjusted under 35 U.S.C. 154(b) by 284 days.

(21) Appl. No.: 16/909,558

(22) Filed: Jun. 23, 2020

(65) Prior Publication Data

US 2020/0409186 A1 Dec. 31, 2020

(30) Foreign Application Priority Data

Jun. 25, 2019 (JP) .............................. JP2019-116903

(51) Int. Cl.
*G02F 1/1343* (2006.01)
*G02F 1/01* (2006.01)
(Continued)

(52) U.S. Cl.
CPC ............ *G02F 1/0136* (2013.01); *G02F 1/015* (2013.01); *G02F 1/093* (2013.01); *G02F 1/0081* (2013.01); *G02F 1/134309* (2013.01)

(58) Field of Classification Search
CPC ...... G02F 1/1343; G02F 1/0136; G02F 1/015; G02F 1/093; G02F 1/0081
See application file for complete search history.

(56) References Cited

U.S. PATENT DOCUMENTS

2015/0183632 A1* 7/2015 Su ...................... G01P 15/124
257/415

FOREIGN PATENT DOCUMENTS

JP 2016-038399 A 3/2016

OTHER PUBLICATIONS

Kadowaki et al., "Giant polarization rotation using a surface current on a SiC LED" The 66th Japan Society of Applied Physics Spring Meeting, Proceedings, 2019 Tokyo Institute of Technology, Ookayama Campus, 2019 Japan Society of Applied Physics, 3 pages.
(Continued)

*Primary Examiner* — Thoi V Duong
(74) *Attorney, Agent, or Firm* — Foley & Lardner LLP

(57) ABSTRACT

A transmissive polarization control device includes: a semiconductor layer having a first surface and a second surface opposite to the first surface, the semiconductor layer including: a first conductivity type region having a conductivity type, a second conductivity type region having a conductivity type, and a pn junction located between the first and second conductivity type regions; a loop electrode disposed on the first surface and configured such that an electric current flowing through the loop produces a magnetic field in a direction penetrating the pn junction; and a near-field light formation region in which an impurity of the first conductivity type introduced as a dopant into the first conductivity type region for formation of near-field light is distributed. A polarization direction of linearly polarized light traveling through a region surrounded by the loop electrode and the near-field light formation region is rotated according to the electric current.

20 Claims, 16 Drawing Sheets

(51) Int. Cl.
*G02F 1/015* (2006.01)
*G02F 1/09* (2006.01)
*G02F 1/00* (2006.01)

(56) References Cited

OTHER PUBLICATIONS

Ohtsu et al., "Gigantic Ferromagnetic Magneto-Optical Effect in a SiC Light-emitting Diode Fabricated by Dressed-Photon-Phonon-Assisted Annealing", Off-shell archive, OffShell: 1809R.001.v1 (2018) 7 pages.
Ohtsu, "Dressed Photons: Concepts of Light-Matter Fusion Technology", pp. 1-9, 200-203, and 212-215, Springer-Verlag Berlin Heidelberg 2014.

* cited by examiner

1
TRANSMISSIVE POLARIZATION CONTROL DEVICE, OPTICAL ISOLATOR, POLARIZATION VARIABLE LIGHT SOURCE, AND METHOD OF MANUFACTURING TRANSMISSIVE POLARIZATION CONTROL DEVICE

CROSS REFERENCE TO RELATED APPLICATION

This application claims priority to Japanese Patent Application No. 2019-116903, filed on Jun. 25, 2019, the disclosure of which is hereby incorporated by reference in its entirety.

BACKGROUND

The present disclosure relates to a transmissive polarization control device, an optical isolator, a polarization variable light source, and a method of manufacturing a transmissive polarization control device.

The Faraday effect, which causes rotation of the polarization direction of transmitted light, and the magneto-optic Kerr effect, which causes rotation of the polarization direction of reflected light, are known as magneto-optical effects. Magneto-optical materials that exhibit magneto-optical effects have been widely used in polarization control devices for controlling the polarization direction of light. Of the conventional magneto-optical materials, for example, magnetic garnet ($Gd_2BiFe_5O_{12}$) with a magnetic field applied thereto can exhibit magneto-optical effects in an infrared range near 800 nm. However, the magnetic garnet cannot exhibit magneto-optical effects in the range of visible light.

In recent years, it has been reported that, by the effect of "dressed photons," which are one kind of near-field light, magneto-optical effects are obtained in the visible light range when a magnetic field is applied across a semiconductor layer. For example, M. Ohtsu and T. Kawazoe, "Gigantic Ferromagnetic Magneto-Optical Effects in a SiC Light-emitting Diode Fabricated by Dressed-Photon-Phonon Assisted Annealing" Off-shell archive, OffShell: 1809R.001.v1 (2018) describes a reflective polarization control device configured to apply a magnetic field across a semiconductor layer to cause rotation of the polarization direction of reflected light in the visible light range using the effect of dressed photons.

SUMMARY

Development of a polarization control device that is different from the reflective polarization control device described in M. Ohtsu and T. Kawazoe has been expected.

According to one embodiment of the present disclosure, a transmissive polarization control device includes: a semiconductor layer having a first surface and a second surface opposite to the first surface, the semiconductor layer including: a first conductivity type region having a conductivity type of one of p-type and n-type, a second conductivity type region having a conductivity type of the other of p-type and n-type, and a pn junction located between the first conductivity type region and the second conductivity type region; a loop electrode through which an electric current flows to produce a magnetic field in a direction penetrating the pn junction, the loop electrode disposed on the first surface; and a near-field light formation region in which an impurity of the first conductivity type introduced as a dopant into the first conductivity type region for formation of near-field light is distributed. A polarization direction of linearly polarized light, traveling through a region surrounded by the loop electrode and the near-field light formation region, is rotated according to the electric current.

According to certain embodiments, a transmissive polarization control device configured to apply a magnetic field across a semiconductor layer to rotate the polarization direction of transmitted light in the visible light range.

DETAILED DESCRIPTION

General Description of Dressed Photons

The theory of dressed photons and details of experiments are described in, for example, *Dressed Photons: Concepts of Light-Matter Fusion Technology*, Motoichi Ohtsu (Springer, Berlin, Heidelberg, 2014). Hereinafter, a brief general description of dressed photons is given. Many aspects of dressed photons have not yet been elucidated. In the present disclosure, the general description of dressed photons and the description of embodiments include hypotheses. Therefore, the descriptions below do not necessarily affirm the principles of the magneto-optical effects obtained by the effect of dressed photons.

Figure 7:
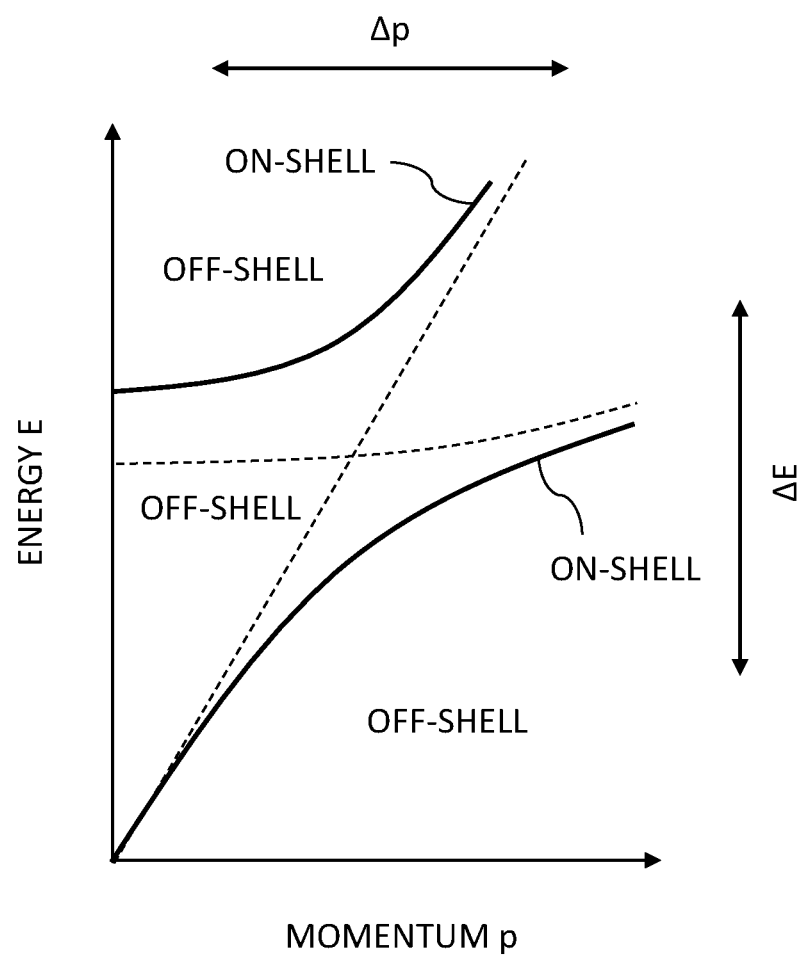
FIG. 7 is a graph schematically showing the dispersion relation of exciton-polaritons.

Dressed photons relate to exciton-polaritons resulting from coupling of excitons, which are electron-hole pairs residing in a semiconductor material, with light. FIG. 7 is a graph schematically showing the dispersion relation of exciton-polaritons. The dashed parabolic curve represents the dispersion relation of excitons. The dashed straight line represents the dispersion relation of light. The solid lines represent the dispersion relation of exciton-polaritons separated into two parts by coupling of excitons with light. The dispersion relation of exciton-polaritons separated into two parts is referred to as "on-shell". Meanwhile, the surrounding of the dispersion relation of exciton-polaritons is referred to as "off-shell". In the off-shell, there are dressed photons, which are virtual photons. Dressed photons are supposed to be photons dressed with the energy of electron-hole pairs. The greater the distance from the dispersion relation of exciton-polaritons is, the lower the probability of creation of dressed photons is.

Dressed photons are present around the dispersion relation of exciton-polaritons and, therefore, the momentum p and the energy E of dressed photons include uncertainties $\Delta p$ and $\Delta E$, respectively. In the on-shell, the localization size of light is approximately as large as the wavelength of light. On the other hand, in the off-shell, the greater the uncertainty $\Delta p$ of the momentum p is, the smaller the uncertainty of the position x of dressed photons represented by $\Delta x \sim h/(2\pi\Delta p)$ (h: Planck constant) is. Therefore, the localization size of dressed photons is much smaller than the wavelength of light. In the on-shell, the creation and annihilation time of light is approximately as long as the vibration period of light. On the other hand, in the off-shell, the greater the uncertainty $\Delta E$ of the energy E is, the shorter the uncertainty of the time t of dressed photons represented by $\Delta t \sim h/(2\pi\Delta E)$ is. Therefore, the creation and annihilation time of dressed photons is much shorter than the vibration period of light. Thus, dressed photons in the off-shell have characteristics that cannot be obtained by the on-shell light.

Dressed photons are virtual photons and therefore do not xist on their own. Dressed photons can exist as dressed photon phonons via, for example, phonons that represent the lattice vibration in crystals. Dressed photons more strongly interact with coherent phonons that regularly vibrate than with incoherent phonons that irregularly vibrate. Coherent phonons can more stably exist in nanomaterials consisting of a small number of atoms than in bulk materials consisting of a large number of atoms. This can also be understood from the fact that, in a model in which atoms are coupled by springs, a large number of atoms in bulk materials vibrate with various periods, while a small number of atoms in nanomaterials regularly vibrate.

In dressed photon phonons, dressed photons are localized in nanomaterials in which coherent phonons are to be created. Dressed photons can be localized in nanomaterials because, as previously described, dressed photons have uncertainty $\Delta p$ of the momentum p, and the localization size of dressed photons is nanosize.

A nanomaterial that can create dressed photons may be, for example, a nanosize tip portion of a material or may be an impurity doped in a semiconductor material.

In the present disclosure, a transmissive polarization control device that exhibits magneto-optical effects due to the effect of near-field light that is localized in nanomaterials is described.

Hereinafter, a transmissive polarization control device, an optical isolator, a polarization variable light source, and a manufacturing method of a transmissive polarization control device according to certain embodiments are described in detail with reference to the drawings. Portions designated by the same reference numeral in different drawings refer to the same or equivalent portions.

The description below is provided as examples for giving a concrete form to the technical concepts of the present disclosure. However, the present invention is not limited to the description below. The description of dimensions, materials, shapes, relative arrangements, etc., of constituent components are not intended to limit the scope of the present invention, but are intended as examples. The sizes, relative positions, etc., of members shown in the drawings may be exaggerated for easy understanding, etc.

Embodiment

Transmissive Polarization Control Device First, an example of a basic configuration of a transmissive polarization control device of an embodiment of the present disclosure and a polarization variable light source that includes the transmissive polarization control device is described with reference to FIG. 1A and FIG. 1B. In the description below, the transmissive polarization control device is simply referred to as "polarization control device".

Figure 1A:
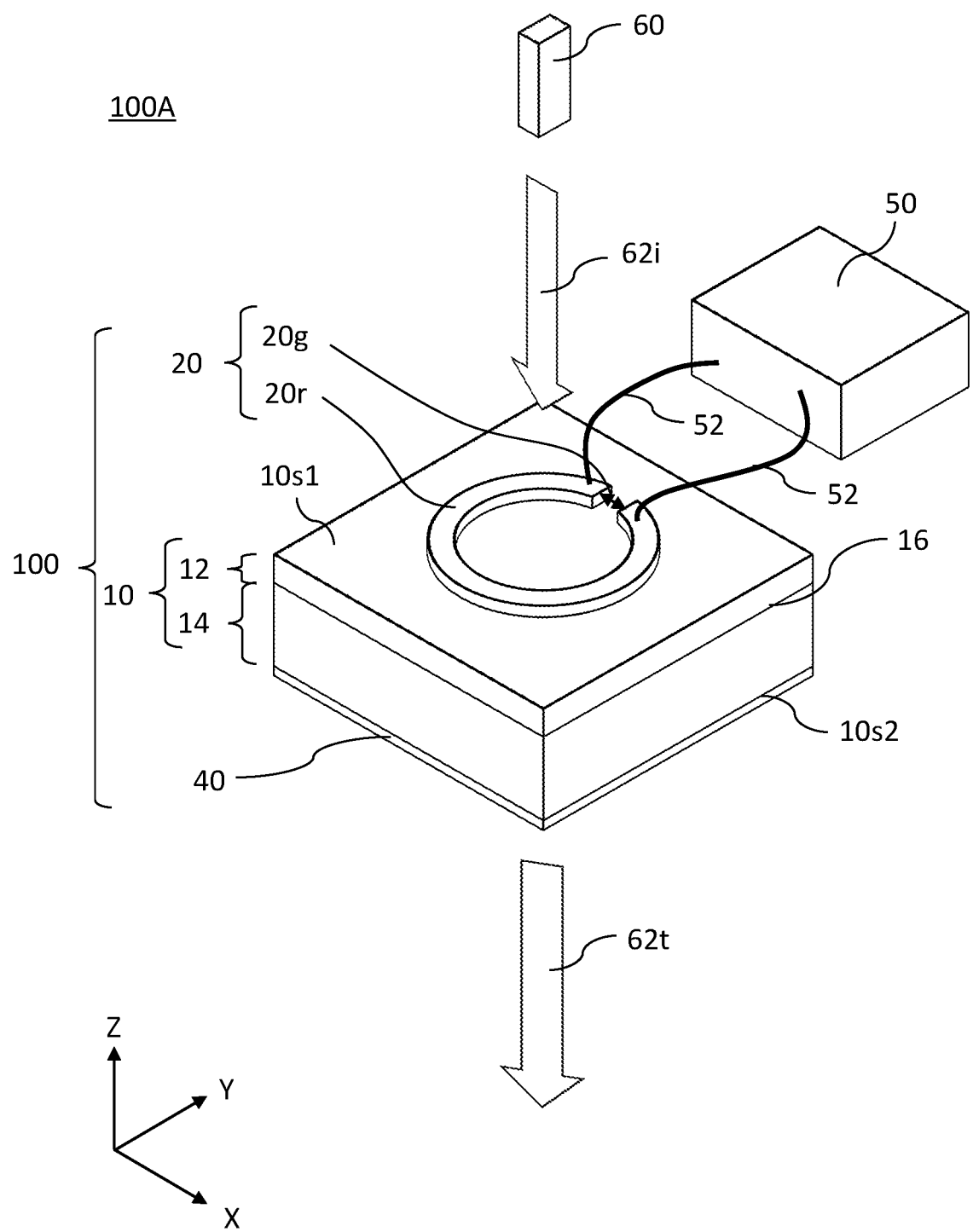
FIG. 1A is a perspective view schematically showing an example of configuration of a polarization variable light source 100A in an embodiment of the present disclosure.
Figure 1B:
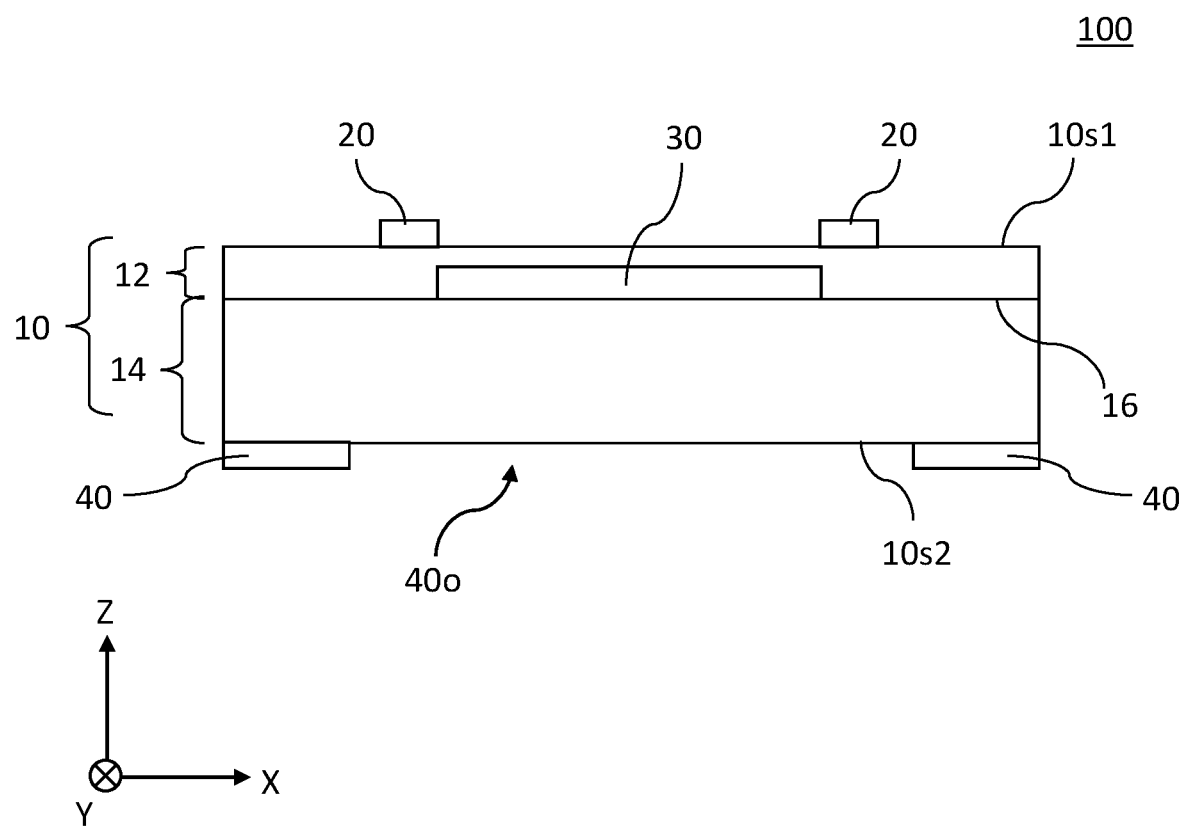
FIG. 1B is a cross-sectional view in the XZ plane, schematically showing an example of configuration of a polarization control device 100 shown in FIG. 1A.

FIG. 1A is a perspective view schematically showing a configuration example of a polarization variable light source 100A in one embodiment of the present disclosure. FIG. 1B is a cross-sectional view in the XZ plane, schematically showing an example of configuration of a polarization control device 100 shown in FIG. 1A. In the attached drawings, for the sake of reference, X, Y and Z axes that are perpendicular to one another are schematically shown.

In the present embodiment, the polarization variable light source 100A includes a polarization control device 100 configured to control the polarization direction of transmitted light, and a light source 60 that includes a semiconductor laser device configured to emit laser light. In the present embodiment, the polarization control device 100 includes a semiconductor layer 10 having a first surface $10s1$ and a second surface $10s2$ that is opposite to the first surface $10s1$, a loop electrode 20 provided on the first surface $10s1$, a near-field light formation region 30 for formation of near-field light in the semiconductor layer 10, and an electrically-conductive member 40 provided on the second surface $10s2$ and having an opening $40o$.

The first surface $10s1$ and the second surface $10s2$ are parallel to the XY plane. The loop electrode 20 includes a ring portion $20r$ defining a gap $20g$. Each of opposite end portions of the loop electrode 20 is electrically connected to a driving circuit 50 by a respective one of wires 52 so that an electric current flows through the loop electrode 20. Planar open arrows represent the traveling directions of light $62i$ that is linearly polarized light emitted from the light source 60 and entering the polarization control device 100 and light 62*t* that is linearly polarized light transmitted through the polarization control device 100. Typically, the light 62*i* passes through a region surrounded by the loop electrode 20 and is incident on the first surface 10*s*1 in a direction perpendicular to the first surface 10*s*1 (the negative direction of the Z axis), and the light 62*t* emitted from the second surface 10*s*2 in a direction perpendicular to the second surface 10*s*2 and passes through the opening 40*o* of the electrically-conductive member 40. In the example shown in FIG. 1A, the polarization directions of the light 62*i* and the light 62*t* are perpendicular to the traveling directions of the light 62*i* and the light 62*t*. The light may be incident on the second surface 10*s*2 and emitted from the first surface 10*s*1.

The semiconductor layer 10 includes a first conductivity type region 12 having a conductivity type of one of p-type and n-type, a second conductivity type region 14 having a conductivity type of the other of p-type and n-type, and a pn junction 16 at an interface between the first conductivity type region 12 and the second conductivity type region 14. The pn junction 16 is located closer to the first surface 10*s*1 than to the second surface 10*s*2. The pn junction 16 can be parallel to the XY plane.

The semiconductor layer 10 may be made of a non-magnetic material. The semiconductor layer 10 can be made of, for example, an indirect bandgap semiconductor material such as SiC or a direct bandgap semiconductor material such as ZnO. These semiconductor materials are transparent in the visible light range and suitable to transmissive polarization rotators. When using SiC, a p-type region is formed by doping SiC with, for example, aluminum (Al) or boron (B) as the p-type impurity, and an n-type region is formed by doping SiC with, for example, nitrogen (N) or phosphorus (P) as the n-type impurity. When using ZnO, a p-type region is formed by doping ZnO with, for example, nitrogen (N) or arsenic (As) as the p-type impurity, and an n-type region is formed by doping ZnO with, for example, aluminum (Al) or gallium (Ga) as the n-type impurity.

The semiconductor layer 10 has a side in the X direction and a side in the Y direction each having a length of, for example, 100 μm or greater and 5000 μm or less. The semiconductor layer 10 has a thickness of, for example, 50 μm or greater and 100 μm or less in the Z direction. The first conductivity type region 12 has a thickness of, for example, 0.1 μm or greater and 3 μm or less in the Z direction. The size of the semiconductor layer 10 may be greater than the size described above. The lengths of the sides in the X direction and the Y direction of the semiconductor layer 10 can be designed to be greater than the beam diameter of the light 62*i*.

When an electric current flows from one to the other of the opposite ends of the loop electrode 20, a magnetic field penetrating through the pn junction 16 in the Z direction is formed. The magnitude of the magnetic field formed by the electric current flowing through the loop electrode is inversely proportional to the distance from the loop electrode. Therefore, if the pn junction 16 is located closer to the first surface 10*s*1 than to the second surface 10*s*2, the distance between the loop electrode 20 and the pn junction 16 is decreased and, thus, the magnetic field can be efficiently applied to the near-field light formation region 30 that is located near the pn junction 16. Application of the magnetic field will be described below in detail. The gap 20*g* of the loop electrode 20 does not form the magnetic field, so that the gap 20*g* having a short length allows for forming a stronger magnetic field. In the loop electrode 20, the length of the gap 20*g* can be 25% or less of the length of the ring portion 20*r*. The intensity of the magnetic field is inversely proportional to the inner diameter of the ring portion 20*r*. That is, the smaller the inside diameter of the ring portion 20*r* is, the stronger the magnetic field is. The inside diameter of the ring portion 20*r* is 50 μm or greater and 3000 μm or less, preferably 50 μm or greater and 1500 μm or less.

The loop electrode 20 can be made of, for example, a non-magnetic metal. The loop electrode 20 can have a layered structure in which, for example, a Cr layer and an Au layer, which are non-magnetic metal layers, are layered in the Z direction. The Cr layer has a thickness of, for example, 80 nm or greater and 120 nm or less. The Au layer has a thickness of, for example, 400 nm or greater and 600 nm or less. The loop electrode may further include a Pt layer. The Pt layer has a thickness of, for example, 80 nm or greater and 120 nm or less. The loop electrode 20 made of a non-magnetic metal does not exhibit magneto-optical effects that are attributed to the material of the loop electrode, and does not rotate the polarization direction of transmitted light. Therefore, in the transmissive polarization control device of the present embodiment, the amount of rotation of polarization varies depending on the magnitude of the magnetic field formed by the electric current flowing through the loop electrode. That is, when a non-magnetic metal is used for the loop electrode, the amount of rotation of polarization can be easily controlled by controlling the electric current flowing through the loop electrode. When the loop electrode 20 is allowed to rotate the polarization direction of transmitted light, the loop electrode 20 may be made of a magnetic metal.

The near-field light formation region 30 is formed in the first conductivity type region 12 so as to be formed along the pn junction 16 by dressed photon phonon-assisted annealing (hereinafter, referred to as "DPP annealing"), details of which will be described later in description of the method of manufacturing according to one embodiment. The DPP annealing is performed by irradiating the semiconductor layer 10 with light while a forward current is flowed through the pn junction 16 such that the first conductivity type region 12 is heated (annealed) by Joule heat.

The first conductivity type region 12, which includes the near-field light formation region 30 and the remaining region, is doped with an impurity of the first conductivity type. The first conductivity type impurity in the near-field light formation region 30 forms near-field light, while the first conductivity type impurity in the other region than the near-field light formation region 30 does not form near-field light. The first conductivity type impurity that forms near-field light is a nanomaterial consisting of a small number of atoms and can be, for example, a dopant pair consisting of two atoms. In a nanomaterial consisting of a small number of atoms, such as dopant pair, coherent phonons stably exist, and near-field light is likely to be formed. In the near-field light formation region 30, a plurality of dopant pairs are distributed. When light of a predetermined wavelength range is incident on the near-field light formation region 30, near-field light is formed. The predetermined wavelength range will be described below. In this specification, a region in which the first conductivity type impurity that forms near-field light is distributed is referred to as "near-field light formation region 30".

Further, a dopant pair in the near-field light formation region 30 has a spin singlet whose spin function is antisymmetric when spins located at two atoms are replaced by each other, and a spin triplet whose spin function is symmetric. The spin singlet has a single energy state. The spin triplet has three degenerate energy states in a zero magnetic field.

When the spin triplet is, as in a dopant pair of Al, more stable in energy than the spin singlet, two spins that are parallel to each other in one of the three energy states of the spin triplet cause properties similar to those of ferromagnetics. Accordingly, properties similar to those of ferromagnetics are exhibited in the near-field light formation region 30. When a magnetic field is applied to the near-field light formation region 30, spins in a plurality of dopant pairs are oriented in the direction of the magnetic field, and the near-field light formation region 30 is magnetized. When viewed in a direction from the first surface 10s1 toward the second surface 10s2, a region surrounded by the loop electrode 20 overlaps the near-field light formation region 30. This arrangement enables the light 62i incident on the region surrounded by the loop electrode 20 to pass through the magnetized near-field light formation region 30, so that magneto-optical effects can be obtained.

The electrically-conductive member 40 is used in DPP annealing for formation of the near-field light formation region 30. In the electrically-conductive member 40 shown in FIG. 13, a region surrounded by the edge of the opening 40o overlap at least a portion of a region on the second surface 10s2 located immediately below the region surrounded by the loop electrode 20. The inner diameter of the region surrounded by the edge of the opening 40o is, for example, 50 μm or greater and 3000 μm or less, preferably 50 μm or greater and 1000 μm or less. The electrically-conductive member 40 is not necessary in the operation of the polarization control device 100 and therefore may be removed after the DPP annealing. However, with the arrangement of the electrically-conductive member 40 described above, the electrically-conductive member 40 does not block traveling of light. Accordingly, when the electrically-conductive member 40 is not removed but remained, the manufacturing steps can be reduced.

The electrically-conductive member 40 can be made of, for example, a non-magnetic metal as is the loop electrode 20. The electrically-conductive member 40 can have a layered structure in which, for example, a Cr layer, a Pt layer and an Au layer, which are non-magnetic metal layers, are layered in the Z direction. The thickness of the Cr layer is, for example, 80 nm or greater and 120 nm or less. The thickness of the Pt layer is, for example, 80 nm or greater and 120 nm or less. The thickness of the Au layer is, for example, 400 nm or greater and 600 nm or less. The electrically-conductive member 40 may be made of a non-magnetic metal or a magnetic metal, as in the loop electrode 20 described above.

The driving circuit 50 can adjust the intensity and direction (±Z direction) of the magnetic field applied to the near-field light formation region 30 by changing the value and direction of the electric current flowing through the loop electrode 20. "+Z direction" refers to a direction that is the same as the direction of the arrow indicative of the Z direction, and "−Z direction" refers to a direction opposite to the direction of the arrow indicative of the Z direction.

The light source 60 can include a laser device configured to emit linearly polarized light. The wavelength of laser light is desirably within a predetermined wavelength range that allows for forming near-field light. The predetermined wavelength range is 80% or greater and 120% or less of the wavelength of the light irradiated in the DPP annealing. When the semiconductor material is SiC, which is an indirect bandgap semiconductor material, the wavelength of light emitted from the semiconductor laser device is, for example, 360 nm or greater and 600 nm or less, preferably 400 nm or greater and 600 nm or less. When the semiconductor material is ZnO, which is a direct bandgap semiconductor material, the wavelength of light emitted from the semiconductor laser device is, for example, 300 nm or greater and 550 nm or less, preferably 360 nm or greater and 550 nm or less. When the wavelength of laser light emitted from the semiconductor laser device is longer than the wavelength corresponding to the energy gap of the semiconductor material that forms the semiconductor layer 10, the light absorption by the semiconductor layer 10 can be reduced.

The semiconductor laser device includes a multilayer structure that includes, for example, an n-type cladding layer, an active layer, and a p-type cladding layer. When a voltage is applied to the p-type cladding layer and the n-type cladding layer such that an electric current greater than the threshold is flowed, the semiconductor laser device emits laser light from the emission end surface of the active layer. The semiconductor laser device emits, for example, laser light in the visible light range or infrared or ultraviolet laser light. Any appropriate semiconductor may be contained in the semiconductor laser device. The semiconductor laser device may include, for example, an arsenide semiconductor such as GaAs or may include a nitride semiconductor such as GaN.

When the light 62i, which is the laser light emitted from the semiconductor laser device, is incident on the magnetized near-field light formation region 30 and passes through the near-field light formation region 30, the polarization direction of the light 62i rotates. The resultant light passes through the second conductivity type region 14 and is emitted as the light 62t toward outside. Through this process, the polarization direction of the light 62t, which is the transmitted light, rotates with respect to the polarization direction of the light 62i, which is the incident light.

As described above, according to the present embodiment, a transmissive polarization control device configured to apply a magnetic field to a semiconductor layer to rotate the polarization direction of transmitted light in the visible light range can be obtained.

Example of Polarization Control Device 100

Next, the experimental results, in which the polarization direction of transmitted light in the visible light range is rotated by the polarization control device 100 at room temperature, are described with reference to FIG. 2A and FIG. 2B. The semiconductor layer 10 is made of 4H—SiC, which is a non-magnetic semiconductor material of indirect bandgap type. In this experiment, the first conductivity type region 12 is a p-type region, the second conductivity type region 14 is an n-type region, and the first conductivity type impurity is a p-type impurity.

Figure 2A:
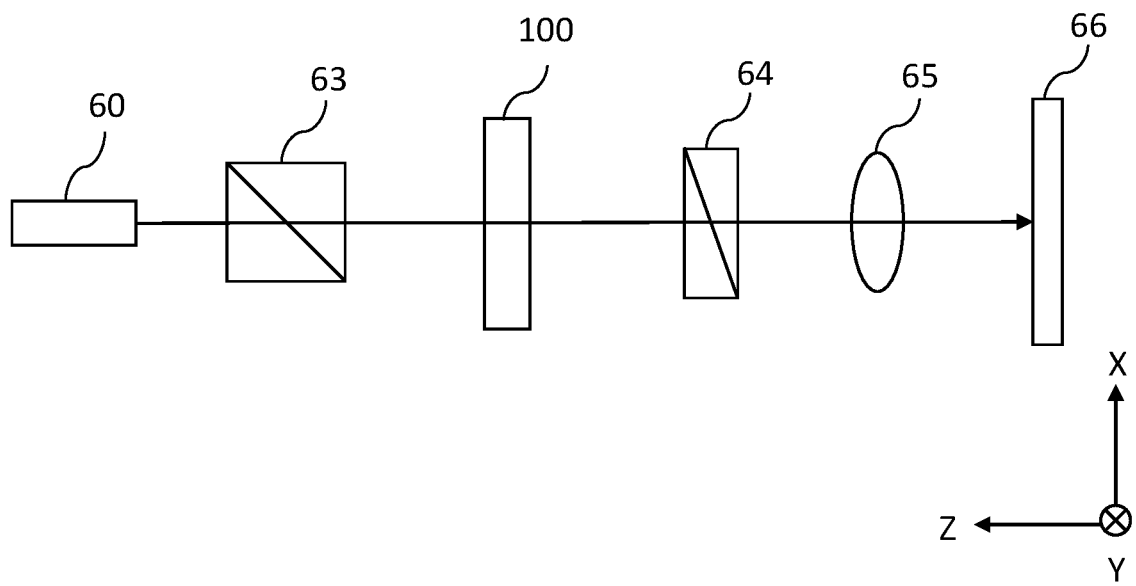
FIG. 2A is a block diagram schematically showing an experimental system.

FIG. 2A is a block diagram schematically showing an experimental system. Laser light with the wavelength of 450 nm emitted from a light source 60 that includes a semiconductor laser device passes through a polarization beam splitter 63 and is incident on the polarization control device 100. The polarization direction of the light that has passed through the polarization beam splitter 63 is parallel to the X direction. The light transmitted through the polarization control device 100 passes through a polarizer 64 and is converged by a lens 65 and detected by a photodetector 66. The polarization direction of the polarizer 64 is parallel to the Y direction and is perpendicular to the polarization direction of the light that has passed through the polarization beam splitter 63.

Figure 2B:
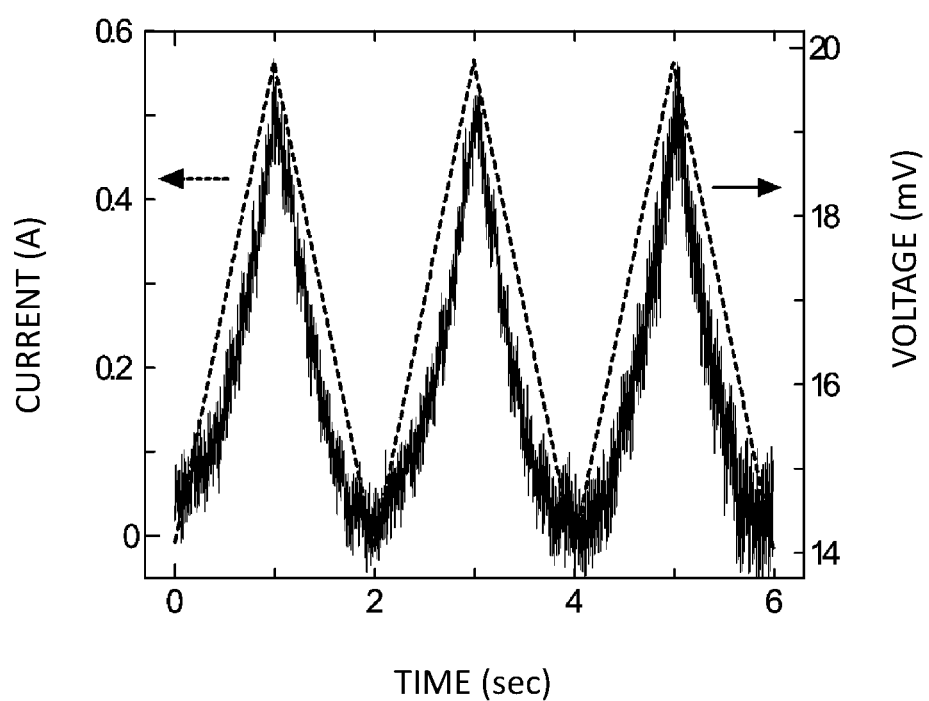
FIG. 2B is an experimental result showing the relationship between the change over time of the value of an electric current flowing through the loop electrode 20 of the polarization control device 100 and the change over time of the amount of light detected by a photodetector 66.

FIG. 2B is an experimental result showing the relationship between the change over time of the value of an electric current flowing through the loop electrode 20 of the polarization control device 100 and the change over time of the amount of light detected by the photodetector 66. The dashed line represents the value of the electric current flowing through the loop electrode 20, and solid line represents the value of the voltage equivalent to the amount of detected light. The voltage was monitored using a photodiode. The value of the electric current flowing through the loop electrode 20 was adjusted using the driving circuit 50 shown in FIG. 1A. When the current value was zero, the amount of detected light was also zero. That is, the polarization direction of the light 62t, which was the transmitted light shown in FIG. 1A, was equal to the polarization direction of the light 62i, which was an incident light. When the current value increased, the amount of detected light also increased according to the current value. When the current value decreased, the amount of detected light also decreased according to the current value. That is, the polarization direction of the light 62t, which was the transmitted light shown in FIG. 1A, rotated according to the value of the electric current flowing through the loop electrode 20. According to the periodic change of the current value, the amount of detected light also periodically changed. The timing of the change of the current value and the timing of the change of the amount of detected light was approximately simultaneous. The ratio of the change of the polarization rotation angle θ with respect to the magnetic flux density was great, and was 5.4 deg/mT. The experimental result shown in FIG. 2B illustrates that the polarization rotation angle of the transmitted light in the visible light range can be controlled by the polarization control device 100.

The degree of the rotation of the polarization direction of the light 62t, which is the transmitted light, also depends on the polarization direction of the light 62i, which is the incident light, and the crystalline orientation of 4H—SiC that forms the semiconductor layer 10. In the crystal of 4H—SiC, when the polarization direction of the light 62i, which is the incident light, is parallel to the direction of the reciprocal lattice space, the polarization direction of the light 62t, which is the transmitted light, makes the largest rotation. The experimental result shown in FIG. 2B applies to this case. If the polarization direction of the light 62i, which is the incident light, is not parallel to the Γ-M direction, the polarization direction of the light 62t, which is the transmitted light, is small. It is thought that such anisotropy in the in-plane direction occurs as described below. In the energy band structure of 4H—SiC, which is an indirect bandgap semiconductor material, the highest energy of the valence band is present at Γ point, and the lowest energy of the conduction band is present at M point. To produce dressed photon phonons between Γ and M where the momentum does not match, aligning a plurality of dopant pairs in the near-field light formation region 30 in a particular direction in the crystal of 4H—SiC is thought to cause anisotropy in the in-plane direction.

As described above, the polarization control device 100 according to the present embodiment can rotate the polarization direction of linearly polarized light passing through the region surrounded by the loop electrode 20 and the near-field light formation region 30 according to the electric current flowing through the loop electrode 20. Thus, the polarization direction of the light 62t emitted from the polarization variable light source 100A of the present embodiment can be changed.

Optical Isolator

Next, an example of a basic configuration of an optical isolator of the present embodiment and a polarization variable light source that includes the optical isolator is described with reference to FIG. 3A and FIG. 3B.

Figure 3A:
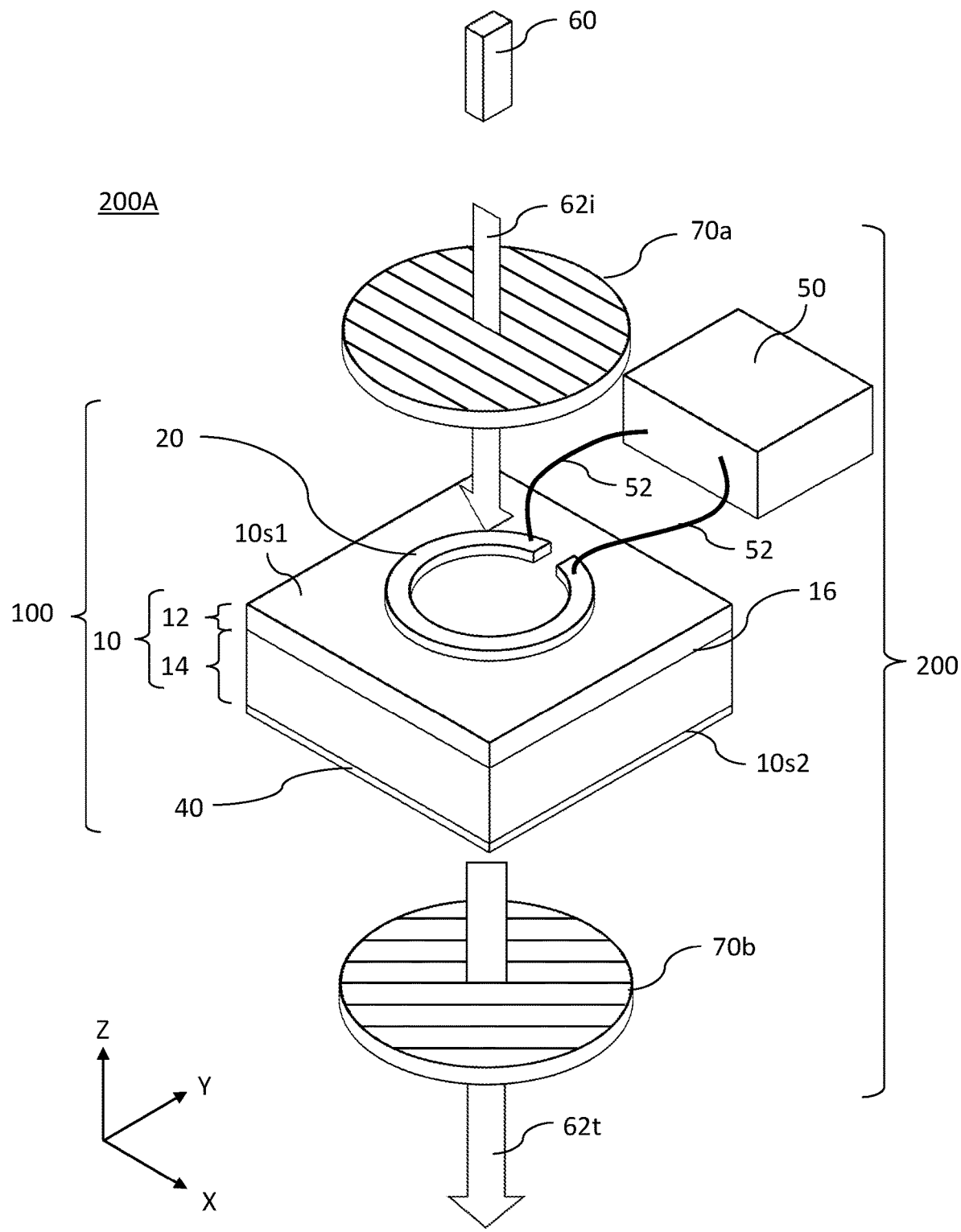
FIG. 3A is a diagram schematically showing emission of light 62$t$ from a polarization variable light source 200A of the present embodiment.

FIG. 3A is a diagram schematically showing emission of light 62t from a polarization variable light source 200A of the present embodiment. FIG. 3B is a diagram schematically showing incidence of a returning reflected light 62r on the polarization variable light source 200A of the present embodiment. The polarization variable light source 200A of the present embodiment includes an optical isolator 200 configured to block returning reflected light, and a light source 60 that includes a semiconductor laser device. The optical isolator 200 of the present embodiment includes a polarization control device 100, a driving circuit 50, a first polarizer 70a located on the light incident side of the polarization control device 100, and a second polarizer 70b located on the light emission side of the polarization control device 100.

The driving circuit 50 is electrically connected with a loop electrode 20 by wires 52 and changes the electric current flowing through the loop electrode 20 to modulate the magnetic field. More specifically, the driving circuit 50 allows an electric current to flow through the loop electrode 20 such that the polarization direction of light transmitted through the polarization control device 100 rotates by 45°.

The polarization directions of the first polarizer 70a and the second polarizer 70b are rotated at 45° with respect to each other. In the examples shown in FIG. 3A and FIG. 3B, the polarization direction of the first polarizer 70a is parallel to the X direction, and the polarization direction of the second polarizer 70b is parallel to a direction rotated by 45° from the direction of the arrow of the X axis toward the direction of the arrow of the Y axis in the XY plane (hereinafter may be referred to as "rotated counterclockwise by 45° in the XY plane"). In each of the first polarizer 70a and the second polarizer 70b, a direction parallel to the stripe pattern corresponds to the polarization direction of the polarizer. The first polarizer 70a and the second polarizer 70b may be also referred to as "pair of polarizers".

In the example shown in FIG. 3A, the polarization direction of the light 62i emitted from the light source 60 is the same as the polarization direction of the first polarizer 70a. Therefore, the light 62i passes through the first polarizer 70a and is incident on the polarization control device 100. The polarization direction of the light 62t traveling through the polarization control device 100 is rotated counterclockwise by 45° in the XY plane with respect to the polarization direction of the light 62i and is therefore the same as the polarization direction of the second polarizer 70b. Thus, the light 62t can pass through the second polarizer 70b.

Figure 3B:
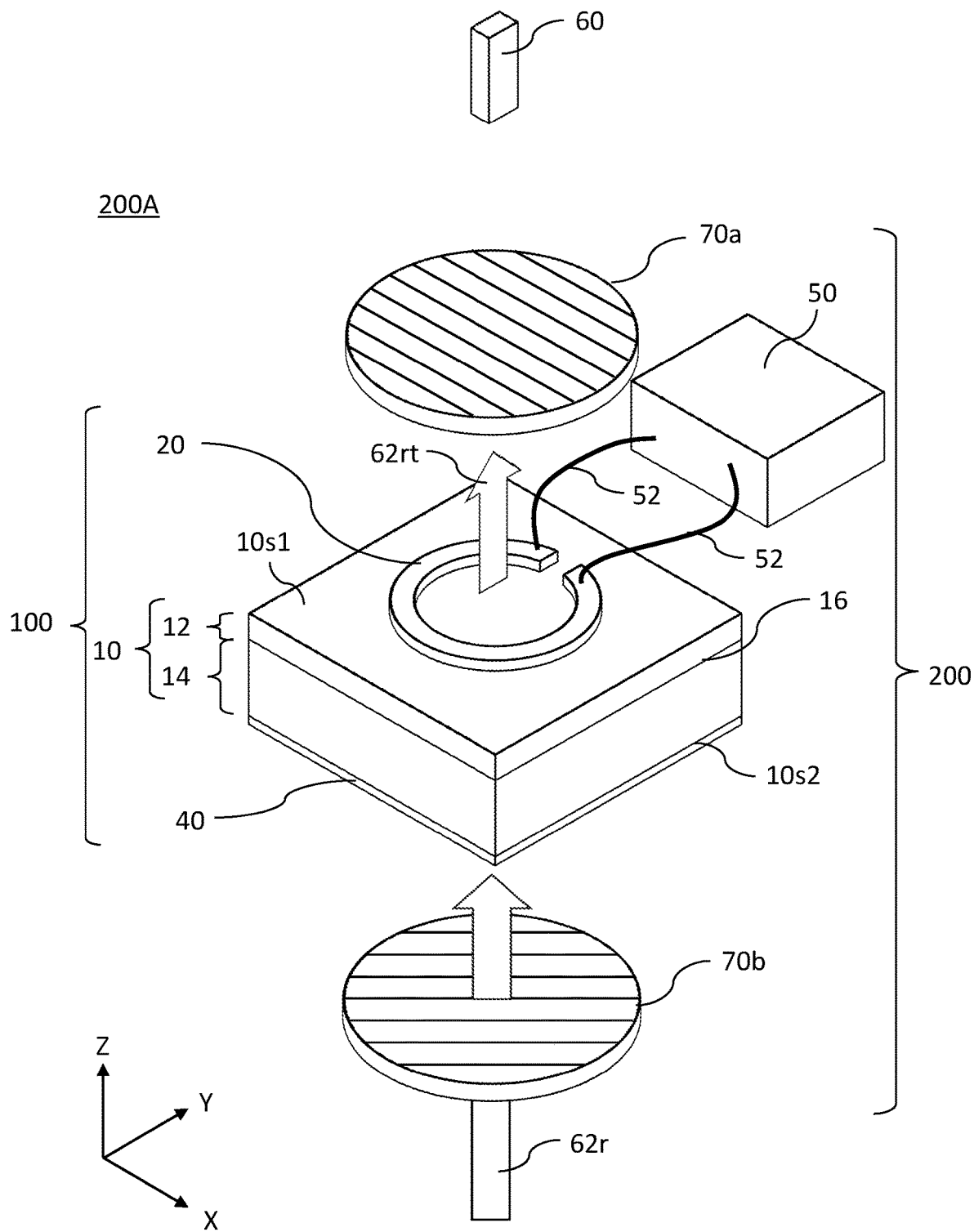
FIG. 3B is a diagram schematically showing incidence of a returning reflected light 62$r$ into the polarization variable light source 200A of the present embodiment.

In the example shown in FIG. 3B, the polarization direction of the returning reflected light 62r is the same as the polarization direction of the second polarizer 70b. Therefore, the light 62r passes through the second polarizer 70b and is incident on the polarization control device 100. The polarization direction of light 62rt traveling through the polarization control device 100 is further rotated counterclockwise by 45° in the XY plane with respect to the light 62r due to the nonreciprocity of magneto-optical effects, and is therefore perpendicular to the polarization direction of the first polarizer 70a. Thus, the light 62rt cannot pass through the first polarizer 70a.

If light emitted from the light source 60 returns to and is incident on the light source 60, the returned incident light may adversely affect the operation of the light source 60. The optical isolator 200 of the present embodiment can reduce the adverse effect that may be otherwise caused by returned light on the operation of the light source 60.

In the polarization variable light source 200A of the present embodiment, the driving circuit 50 changes the value of the electric current flowing through the loop electrode 20 to adjust the polarization rotation angle of light traveling through the polarization control device 100, so that the intensity of light emitted from the second polarizer 70b can be adjusted. When the polarization rotation angle of light transmitted through the polarization control device 100 is 0°, the intensity of light emitted from the second polarizer 70b is zero. When the polarization rotation angle of light transmitted through the polarization control device 100 is 45°, the intensity of light emitted from the second polarizer 70b is the maximum.

When the value of an electric current supplied into a semiconductor laser device is changed for adjusting the intensity of light emitted from the semiconductor laser device, the operation of the semiconductor laser device may be unstable. In contrast, in the polarization variable light source 200A, the intensity of emitted light can be adjusted outside the light source 60.

As described above, in the present disclosure, due to the magneto-optical effects obtained by near-field light, the polarization direction of transmitted light in the visible light range can be rotated by applying a magnetic field to a semiconductor layer.

Variation of Loop Electrode

While the ring portion 20r of the loop electrode 20 in the example described above defines a single gap 20g, the ring portion 20r may define two or more gaps.

Figure 4A:
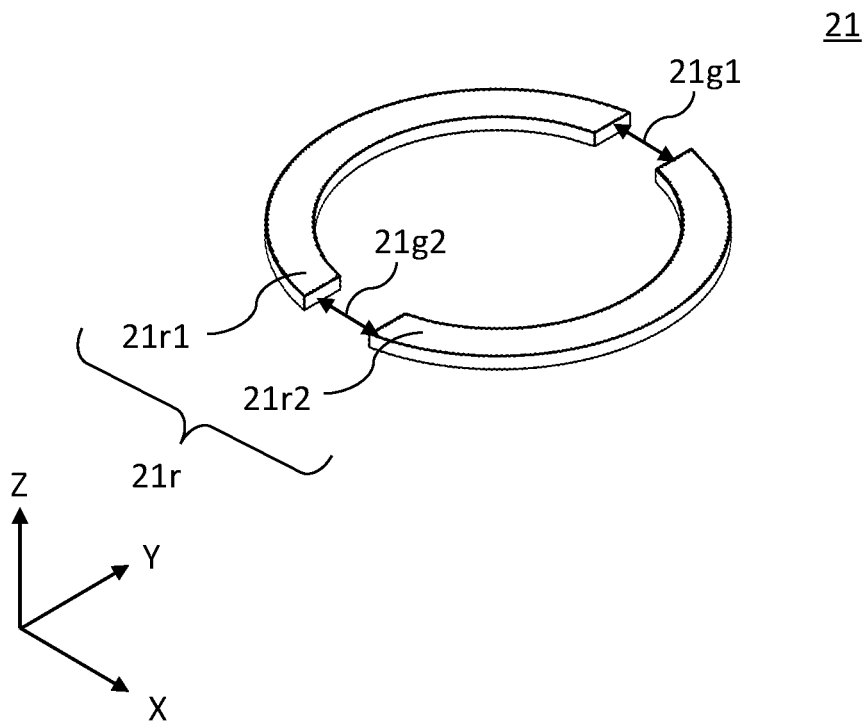
FIG. 4A is a diagram schematically showing an example of configuration of a loop electrode 21 of the first variation.

FIG. 4A is a diagram schematically showing an example of configuration of a loop electrode 21 of the first variation. The loop electrode 21 includes a ring portion 21r defining a first gap 21g1 and a second gap 21g2. The ring portion 21r includes a first arc portion 21r1 and a second arc portion 21r2. The first arc portion 21r1 and the second arc portion 21r2 face each other such that the curved parts face outward. The first gap 21g1 and the second gap 21g2 refer to the spaces between the first arc portion 21r1 and the second arc portion 21r2. As described above, with a small length of the gap, a strong magnetic field is formed. In the example shown in FIG. 4A, the total of the length of the first gap 21g1 and the length of the second gap 21g2 is 25% or less of the total of the length of the arc of the first arc portion 21r1 and the length of the arc of the second arc portion 21r2. When an electric current flows from one end to the other end of each of the first arc portion 21r1 and the second arc portion 21r2 such that the electric currents flow in the same clockwise directions in the XY plane, a magnetic field occurs in the −Z direction in the region surrounded by the loop electrode 21. When electric currents flow in the same counterclockwise directions in the XY plane, a magnetic field occurs in the +Z direction in the region surrounded by the loop electrode 21.

The loop electrode may further include a spiral conductor or coil conductor having one or more turns. The magnitude of the magnetic field formed by an electric current flowing through the loop electrode increases based on the superposition principle. Therefore, when using the loop electrode having a plurality of turns, a larger magnetic field can be applied with the same current value, as compared with a case of using a loop electrode having a single turn. In other words, when magnetic fields of the same magnitudes are applied using a loop electrode having a single turn and a loop electrode having two or more turns, the current value necessary for the loop electrode having two or more turns can be smaller. This allows for reducing deterioration of the polarization control device 100 that is attributed to the heat generated by the electric current flowing through the loop electrode.

Figure 4B:
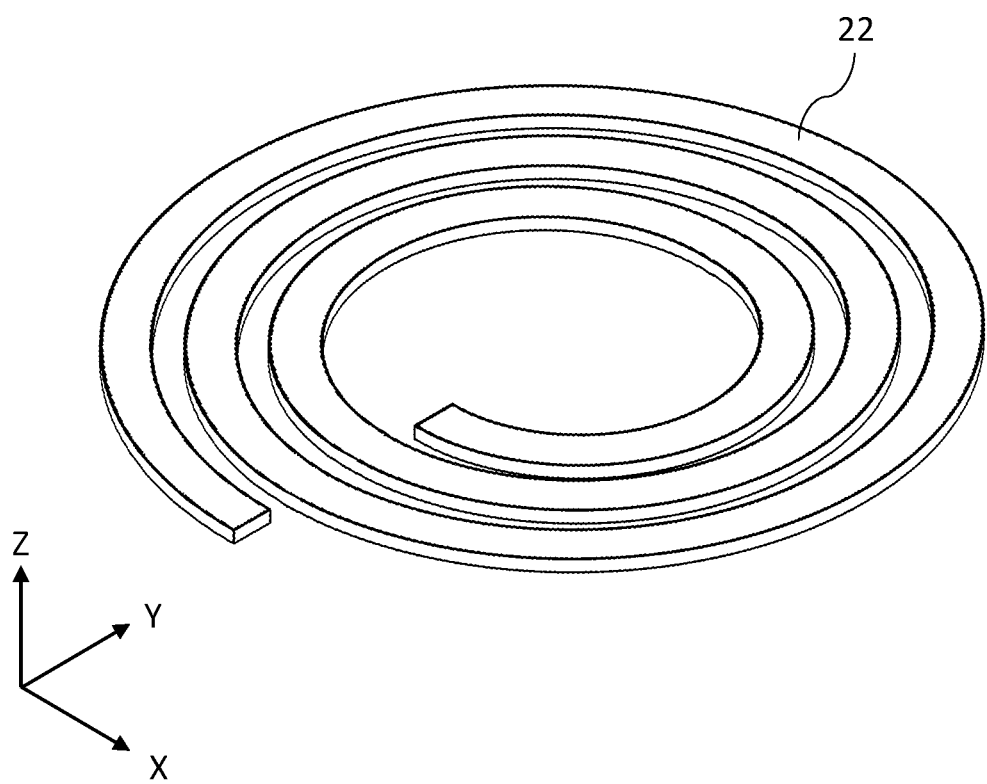
FIG. 4B is a diagram schematically showing an example of configuration of a loop electrode 22 of the second variation.

FIG. 4B is a diagram schematically showing an example of configuration of a loop electrode 22 of the second variation. The loop electrode 22 includes a spiral conductor having three turns. The spiral conductor has one or more turns, and may include any appropriate number of turns. When an electric current flows through the spiral conductor from one end to the other end of the spiral conductor, a magnetic field is produced in the Z direction in a region surrounded by the innermost ring portion of the loop electrode 22 when viewed in the Z direction. The magnetic field increases in proportion to the number of turns.

Figure 4C:
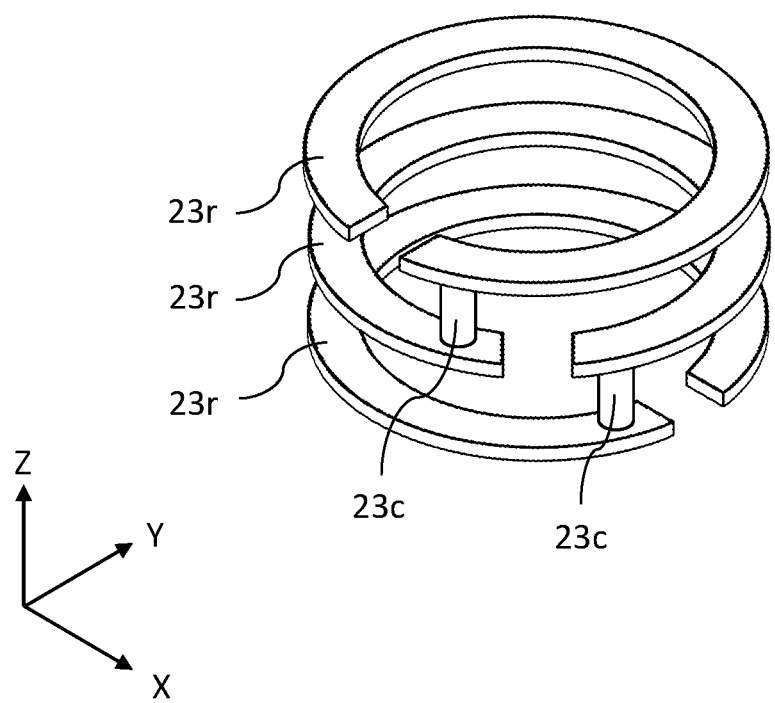
FIG. 4C is a diagram schematically showing an example of configuration of a loop electrode 23 of the third variation.

FIG. 4C is a diagram schematically showing an example of configuration of a loop electrode 23 of the third variation. The loop electrode 23 includes a coil conductor having three turns. The loop electrode 23 has one or more turns, and may have any appropriate number of turns. The coil conductor can have a structure in which, for example, a plurality of ring portions 23r, each defining a gap, are layered in the Z direction via respective insulating layers (not shown in the drawing). End portions of adjacent ring portions 23r are electrically coupled together by an electrically-conductive portion 23c such that an electric current flows in the same direction through the plurality of ring portions 23r. When an electric current flows through the coil conductor from a first end portion to a second end portion of the coil conductor, a magnetic field is produced in the Z direction in a region surrounded by the loop electrode 23 when viewed in the Z direction. The magnetic field increases in proportion to the number of turns. The first end portion of the coil conductor refers to one of the two opposite end portions of the lowermost ring portion 23r that is not connected with the electrically-conductive portion 23c. The second end portion of the coil conductor refers to one of the two opposite end portions of the uppermost ring portion 23r that is not connected with the electrically-conductive portion 23c.

The same effects can be obtained using the loop electrode 21, the loop electrode 22, or the loop electrode 23 shown in FIG. 4A, FIG. 4B or FIG. 4C, respectively, instead of the loop electrode 20 shown in FIG. 1A.

Method of Manufacturing Polarization Control Device

Hereinafter, one embodiment of a method of manufacturing a polarization control device of the present disclosure is described with reference to FIG. 5A through FIG. 5D and FIG. 6A through FIG. 6D. The method of manufacturing a polarization control device according to the embodiment described below includes forming a plurality of polarization control devices in a semiconductor wafer, and dividing the semiconductor wafer into individual polarization control devices to obtain a single polarization control device.

FIG. 5A through FIG. 5D are diagrams for illustrating the method of manufacturing the polarization control device 100 of the present embodiment.

Figure 5A:
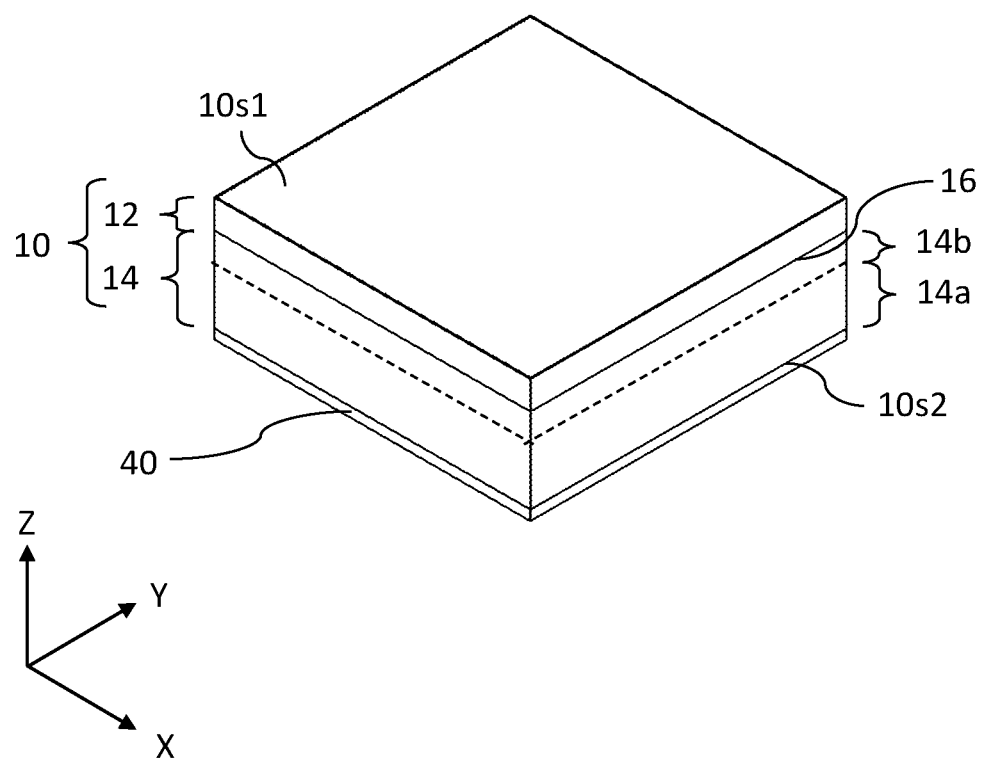
FIG. 5A is a diagram for illustrating the manufacturing method of the polarization control device 100 of the present embodiment.
Figure 5B:
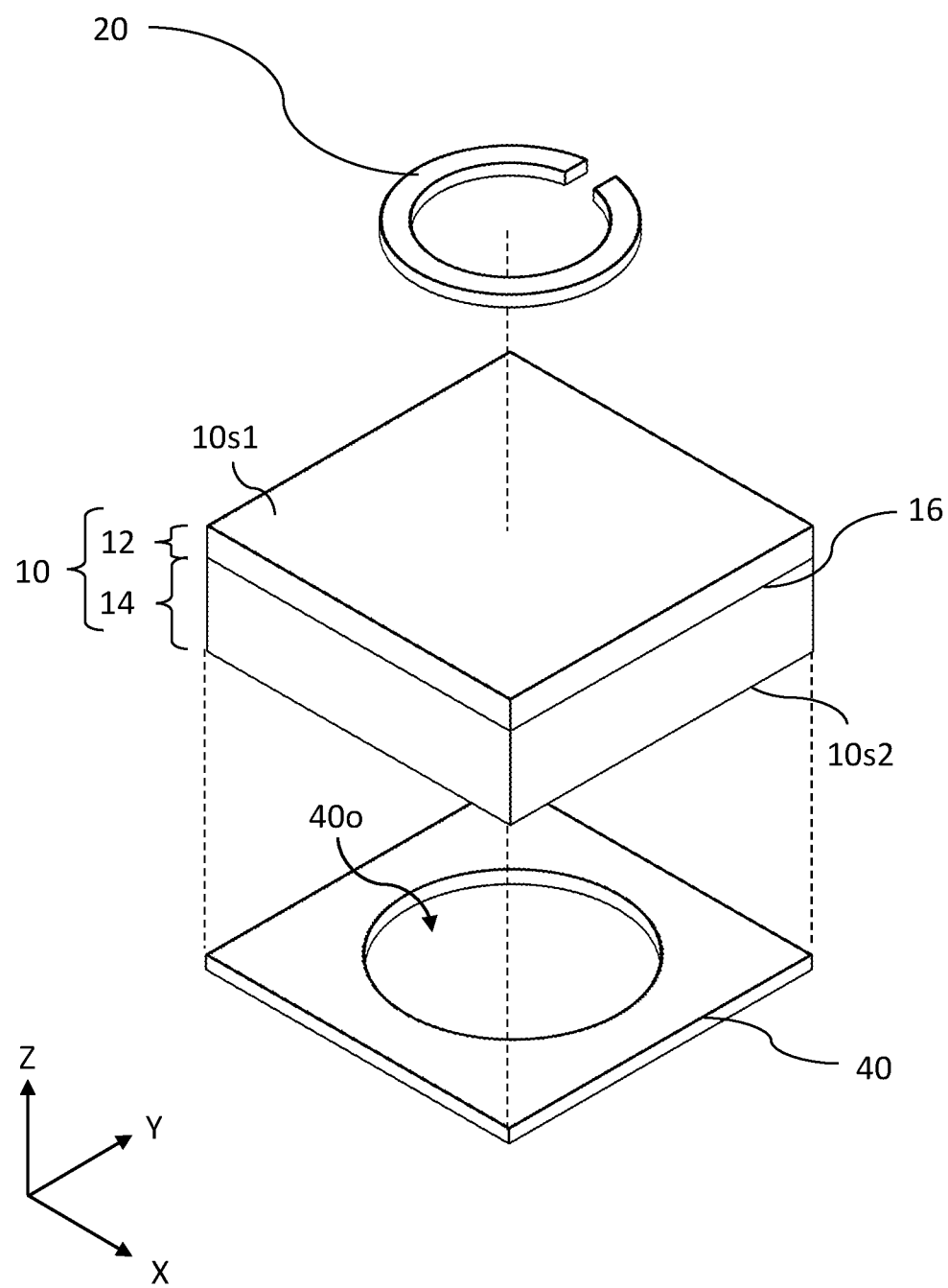
FIG. 5B is a diagram for illustrating the manufacturing method of the polarization control device 100 of the present embodiment.

A semiconductor layer 10 is provided as shown in FIG. 5A. The semiconductor layer 10 includes a first conductivity type region 12 having a conductivity type of one of p-type and n-type, a second conductivity type region 14 whose conductivity type is the other of p-type and n-type, and a pn junction 16 located between the first conductivity type region 12 and the second conductivity type region 14. The semiconductor layer 10 includes, as shown in FIG. 5B, a first electrode disposed on the first surface 10s1 of the semiconductor layer 10 and a second electrode disposed on the second surface 10s2 that is opposite to the first surface 10s1 of the semiconductor layer 10.

The first conductivity type region 12 contains a p-type or n-type impurity. The second conductivity type region 14 contains an impurity having a different conductivity type from that of the impurity of the first conductivity type region 12. The first conductivity type impurity can be contained in the first conductivity type region 12 by, for example, ion implantation. When performing ion implantation, annealing may be carried out after the ion implantation in order to recover the crystalline structure of the semiconductor layer 10. The annealing may be carried out once for a predetermined period or may be carried out a plurality of times.

The first electrode is a loop electrode 20, and the second electrode is an electrically-conductive member 40 that defines an opening 40o.

Figure 5C:
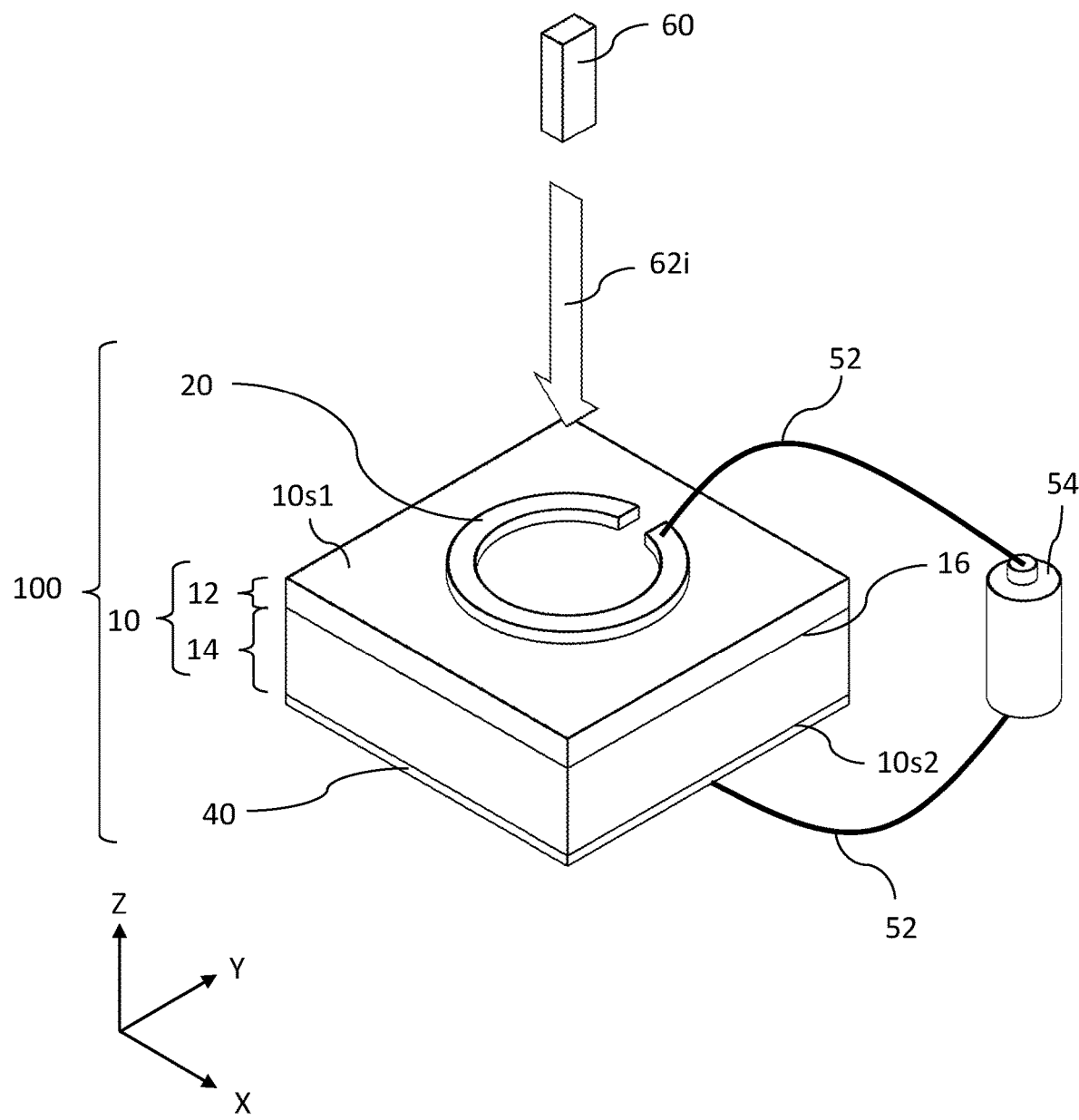
FIG. 5C is a diagram for illustrating the manufacturing method of the polarization control device 100 of the present embodiment.

In a subsequent step, as shown in FIG. 5C, a power supply 54 is electrically connected to the first electrode and the second electrode by wires 52. The semiconductor layer 10 is irradiated with laser light while a forward current is flowed between the first electrode and the second electrode, resulting in formation of a near-field light formation region 30 in which the first conductivity type impurity that forms near-field light is distributed. Annealing of the first conductivity type region 12 by Joule heat causes diffusion of the impurity, so that redistribution of the impurity occurs. By irradiating laser light to the semiconductor layer, dressed photons and dressed photon phonons are generated at the positions of the impurity.

The dressed photon phonons have uncertainty Δp of the momentum p as the dressed photons do. Therefore, the momentum mismatch between the highest energy of the valence band and the lowest energy of the conduction band does not matter. Even in the case of using an indirect bandgap semiconductor material, stimulated emission occurs in the vicinity of the pn junction 16 where population inversion occurs due to the forward current. The stimulated emission causes dopant pairs to lose energy, and thermodiffusion of the dopant pairs ceases. As a result, the dopant pairs are distributed in a self-organizing manner at positions that are determined according to the irradiated light. Although this distribution is nonuniform, whether the distribution is uniform or nonuniform does not matter to formation of near-field light. The region in which a plurality of dopant pairs are distributed corresponds to the near-field light formation region 30 shown in FIG. 13. After the DPP annealing, when light in the predetermined wavelength range described above is incident on the near-field light formation region 30, near-field light is formed even if no forward current flows. When a forward current flows through SiC that is the indirect bandgap semiconductor material after the DPP annealing, emission of light occurs. In this case, the emitted light contains light of the same wavelength as that of the light irradiated in the DPP annealing.

Figure 5D:
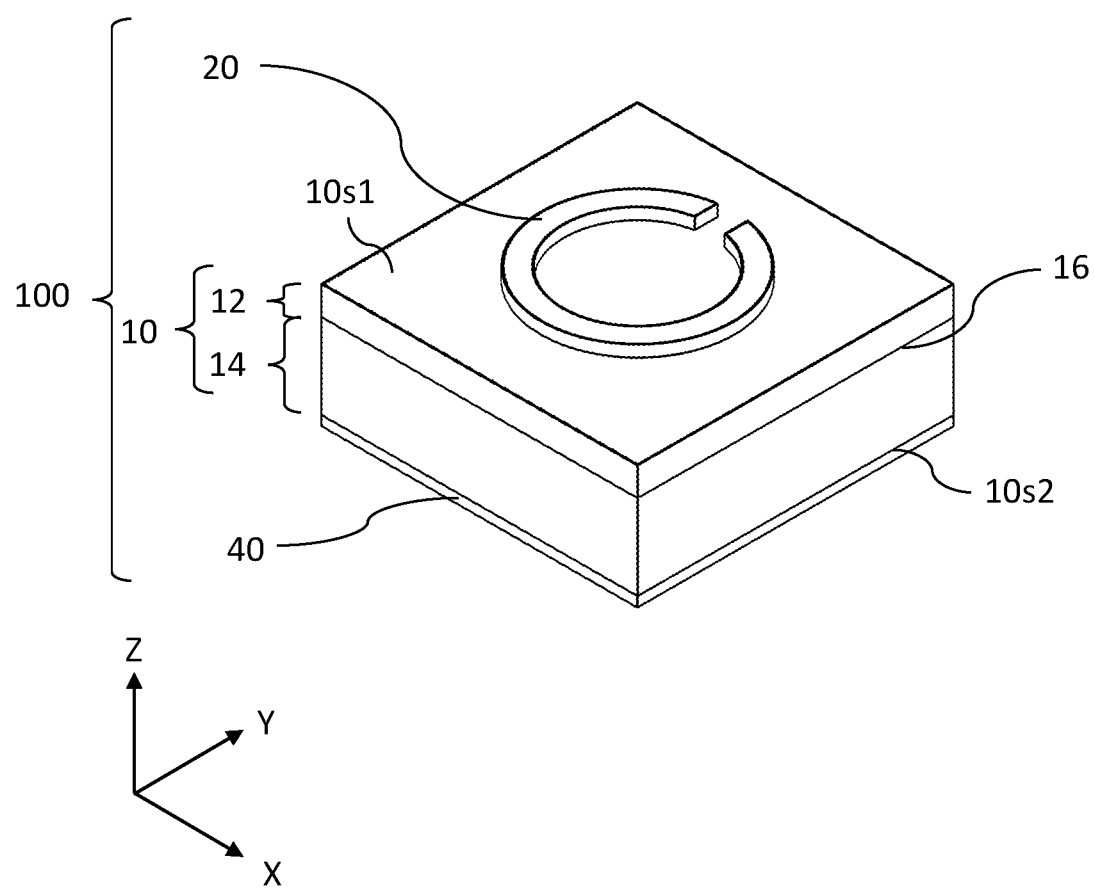
FIG. 5D is a diagram for illustrating the manufacturing method of the polarization control device 100 of the present embodiment.

In a subsequent step, the wires 52 and the power supply 54 are removed, so that a polarization control device 100 is obtained as shown in FIG. 5D. The electrically-conductive member 40 on the second surface 10s2 is not needed for the operation of the polarization control device 100, and thus may be removed.

In the example described hereinafter, the semiconductor layer 10 is made of 4H—SiC.

In one example, the semiconductor layer 10 is formed as described below. An n-type SiC buffer layer having a thickness of 100 nm or greater and 500 nm or less is formed on an n-type 4H—SiC substrate (0001) of 10 mΩ cm or greater and 1000 mΩ cm or less, and an n-type SiC epitaxial layer having a thickness of 1 μm or greater and 10 μm or less is formed on the n-type SiC buffer layer. The n-type impurity is nitrogen (N). The amount of N introduced as the dopant in the n-type 4H—SiC substrate (0001) is, for example, $1 \times 10^{16}$ cm$^{-3}$ or more and $2 \times 10^{19}$ cm$^{-3}$ or less. The amount of N introduced as the dopant in the n-type SiC epitaxial layer is, for example, $1 \times 10^{15}$ cm$^{-3}$ or more and $1 \times 10^{16}$ cm$^{-3}$ or less. By carrying out ion implantation of Al ion as the p-type impurity into a surface of the n-type SiC epitaxial layer, the surface of the n-type SiC epitaxial layer becomes a p-type SiC layer. The amount of Al introduced as the dopant in the p-type SiC layer $1 \times 10^{18}$ cm$^{-3}$ or more and $2 \times 10^{19}$ cm$^{-3}$ or less in the vicinity of the pn junction 16. After the ion implantation, annealing may be carried out a plurality of times for recovering the crystalline structure. The duration of a single annealing period is, for example, 3 minutes or greater and 15 minutes or less, preferably 3 minutes or greater and 10 minutes or less.

While the c-axis of the n-type 4H—SiC substrate (0001) is parallel to the Z direction in the present embodiment, the c-axis of the n-type 4H—SiC substrate (0001) may not be parallel to the Z direction. However, when the c-axis is not parallel to the Z direction, the polarization direction of light passing through the polarization control device 100 in the Z direction can rotate due to birefringence, even without applying a magnetic field.

As shown in FIG. 5A, the second conductivity type region 14 includes a first sub-region 14a and a second sub-region 14b overlying the first sub-region 14a. The n-type 4H—SiC substrate (0001) and the n-type SiC buffer layer correspond to the first sub-region 14a.

The n-type SiC epitaxial layer corresponds to the second sub-region 14b. The p-type SiC layer corresponds to the first conductivity type region 12.

In a subsequent step, as shown in FIG. 5B, a loop electrode 20 is provided on the first surface 10s1 of the semiconductor layer 10, and an electrically-conductive member 40 that has an opening 40o is provided on the second surface 10s2 of the semiconductor layer 10. In FIG. 5B, for the sake of convenience in description, the loop electrode 20, the semiconductor layer 10 and the electrically-conductive member 40 are shown as being separate from one another. Light that has passed through the region surrounded by the loop electrode 20 and are incident on the first surface 10s1 is emitted from the second surface 10s2, and travels through the opening 40o of the electrically-conductive member 40.

In a subsequent step, as shown in FIG. 5C, DPP annealing is carried out. More specifically, a power supply 54 is electrically connected to the loop electrode 20 and the electrically-conductive member 40 by wires 52, and the semiconductor layer 10 is irradiated with light 62i that is laser light emitted from the light source 60 while a forward current is flowed between the loop electrode 20 and the electrically-conductive member 40. When a forward current having a current density of 1 A/cm$^2$ or greater and 3 A/cm$^2$ or less is flowed between the loop electrode 20 and the electrically-conductive member 40 such that the first conductivity type region 12 is annealed by Joule heat, the p-type impurity is thermally diffused along the pn junction 16 to cause redistribution of the p-type impurity. In this annealing, irradiating the first conductivity type region 12 with light 62i, which is laser light having a wavelength of, for example, 365 nm or greater and 450 nm or less and having a power of, for example, 20 mW or greater and 100 mW or less for a duration of 30 minutes or greater and 120 minutes or less causes the p-type impurity to form a plurality of dopant pairs (Al dopant pairs) according to the irradiated light. Coherent phonons in these dopant pairs and dressed photons converted from the irradiated light cause an interaction, so that dressed photon phonons can be produced.

In a subsequent step, the wires 52 and the power supply 54 are removed, so that a polarization control device 100 can be obtained as shown in FIG. 5D. The electrically-conductive member 40 on the second surface 10s2 is not needed for the operation of the polarization control device 100, and thus may be removed.

Next, an alternative method of manufacturing a polarization control device according to the present disclosure is described with reference to FIG. 6A through FIG. 6D. FIG. 6A through FIG. 6D are diagrams for illustrating the manufacturing method of the polarization control device 110 of the present embodiment.

A semiconductor layer 10, a first electrode 80a on the first surface 10s1 of the semiconductor layer 10, and a second electrode 80b on the second surface 10s2 of the semiconductor layer 10 are provided. The semiconductor layer 10 includes a first conductivity type region 12 having a conductivity type of one of p-type and n-type, a second conductivity type region 14 having a conductivity type of the other of p-type and n-type, and a pn junction 16 located between the first conductivity type region 12 and the second conductivity type region 14. The first electrode 80a can have, for example, an "H"-like shape. The second electrode 80b can have, for example, a flat-plate shape. The first electrode 80a and the shape of the second electrode 80b may have any appropriate shapes.

Figure 6A:
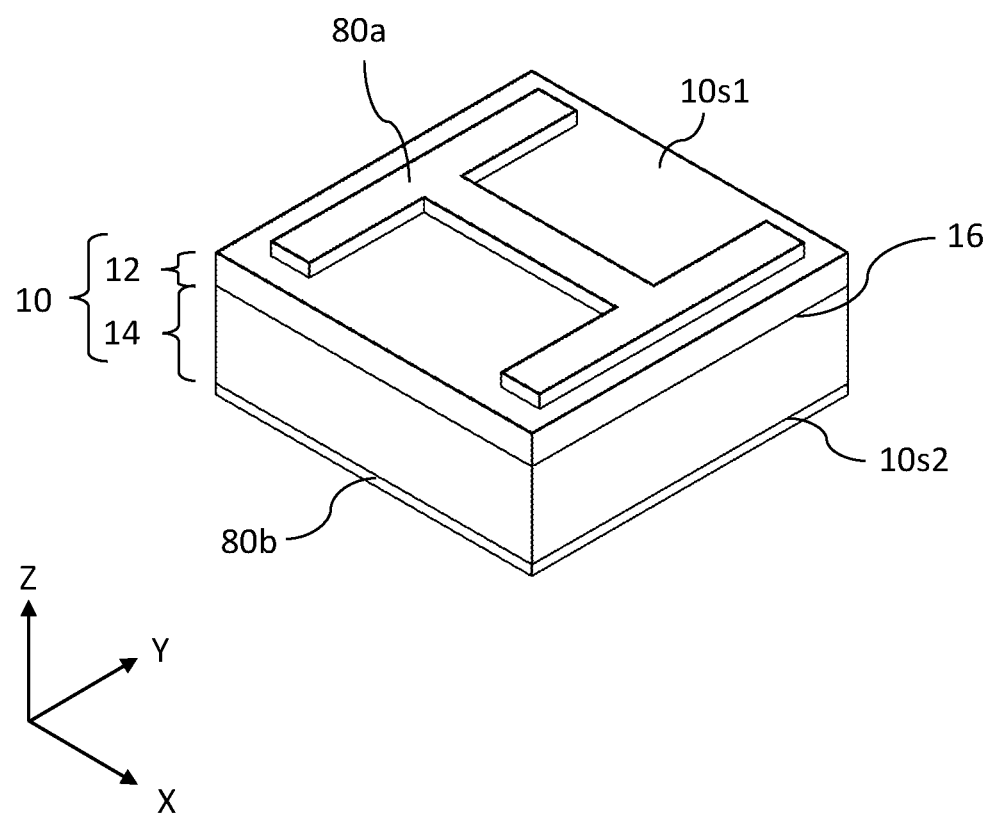
FIG. 6A is a diagram for illustrating the manufacturing method of the polarization control device 110 of the present embodiment.
Figure 6B:
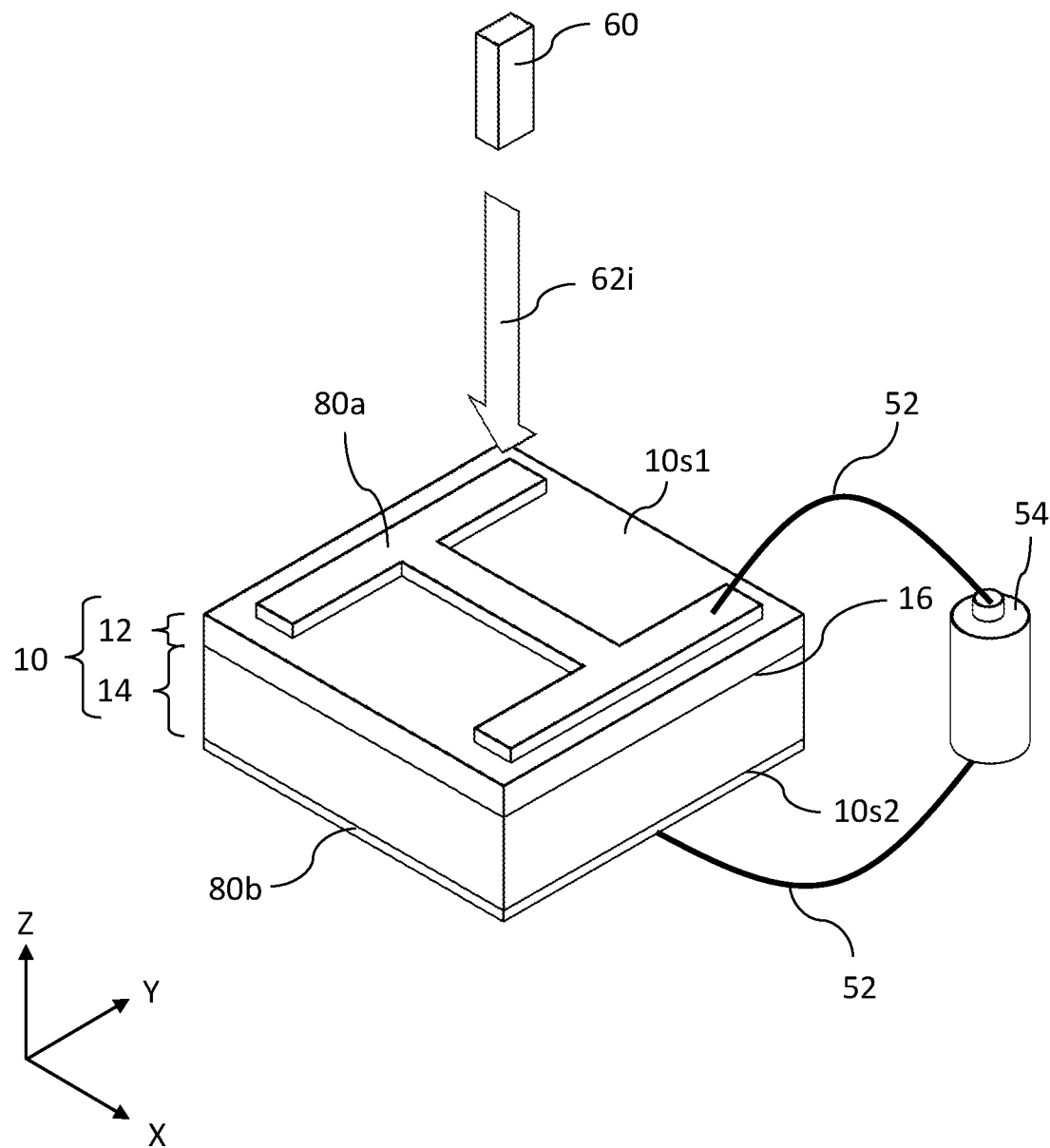
FIG. 6B is a diagram for illustrating the manufacturing method of the polarization control device 110 of the present embodiment.

In a subsequent step, DPP annealing is carried out as shown in FIG. 6B. More specifically, a power supply 54 is electrically connected to the first electrode 80a and the second electrode 80b by wires 52, and the semiconductor layer 10 is irradiated with light 62i, which is laser light emitted from the light source 60, while a forward current is flowed between the first electrode 80a and the second electrode 80b. Accordingly, a near-field light formation region 30 is formed in the first conductivity type region 12 as shown in FIG. 1B. The light 62i, which is laser light, can be incident on the semiconductor layer 10 at a portion of the first surface 10s1 of the semiconductor layer 10 in which the first electrode 80a is not provided. When the first electrode 80a is a transparent electrode made of ITO or the like, the first electrode 80a may cover the entirety of the first surface 10s1.

Figure 6C:
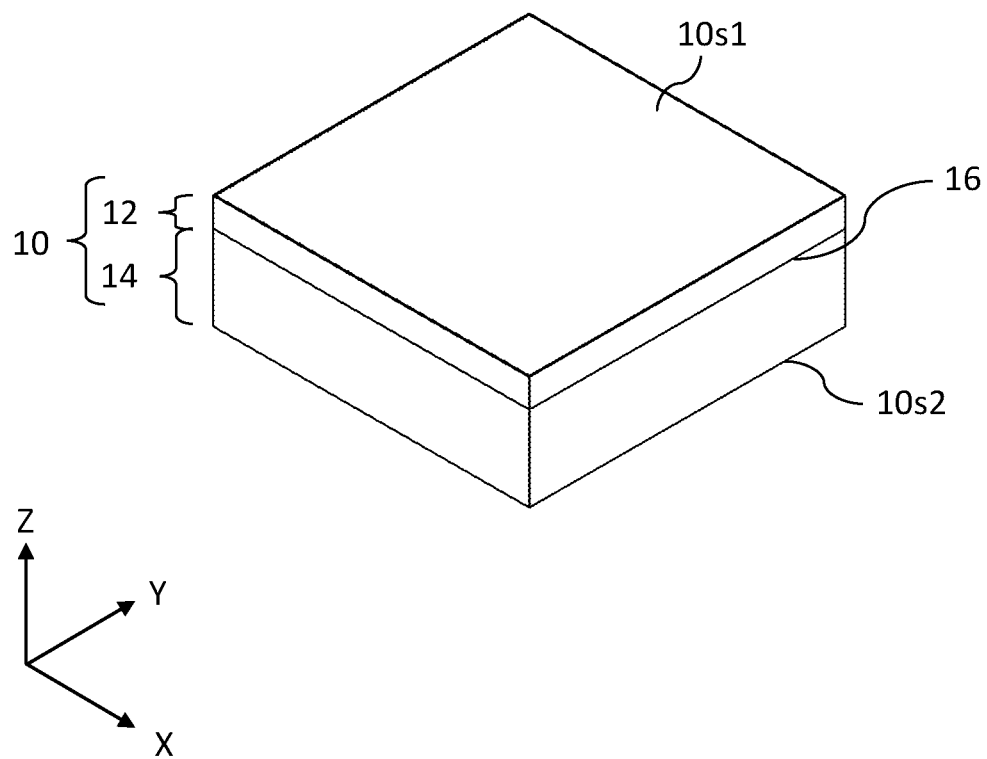
FIG. 6C is a diagram for illustrating the manufacturing method of the polarization control device 110 of the present embodiment.

In a subsequent step, the first electrode 80a and the second electrode 80b are removed as shown in FIG. 6C. When the second electrode 80b is a transparent electrode, the second electrode 80b may not be removed.

Figure 6D:
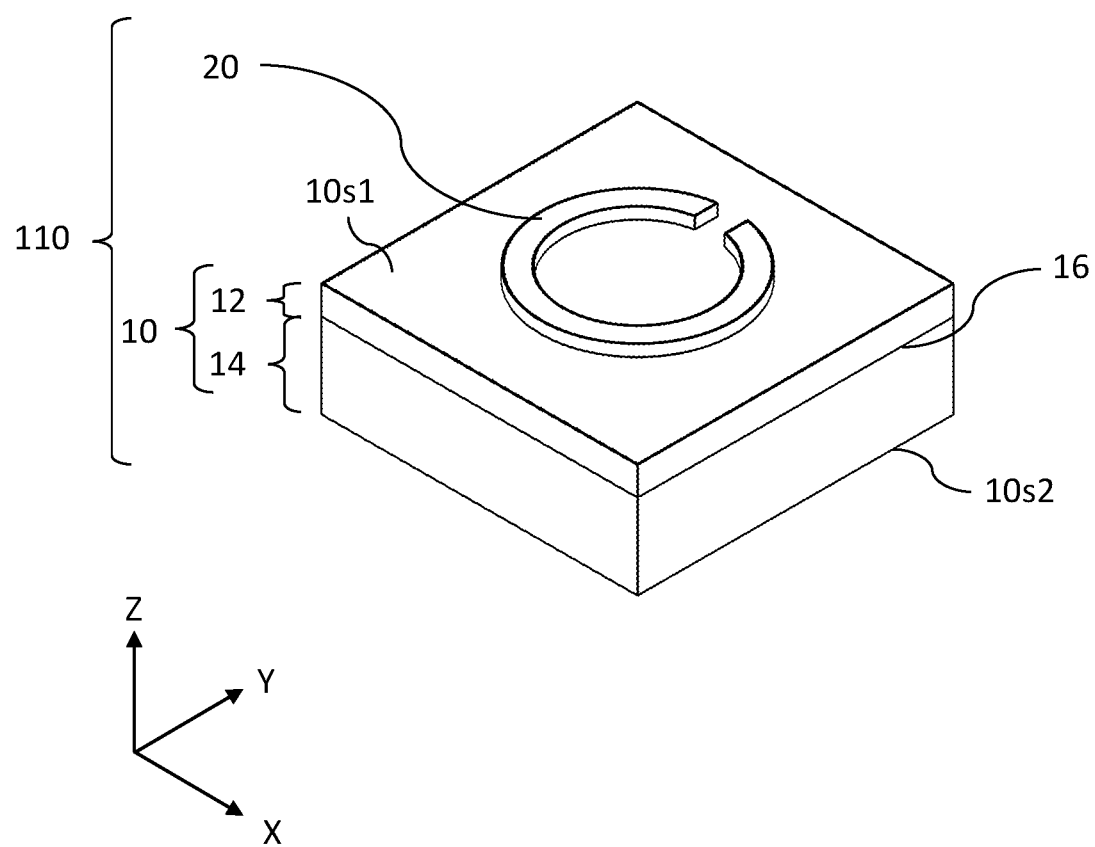
FIG. 6D is a diagram for illustrating the manufacturing method of the polarization control device 110 of the present embodiment.

In a subsequent step, a loop electrode 20 is formed on the first surface 10s1 of the semiconductor layer 10, so that a polarization control device 110 can be obtained as shown in FIG. 6D. The polarization control device 110 shown in FIG. 6D is different from the polarization control device 100 shown in FIG. 5D in that the polarization control device 110 does not include the electrically-conductive member 40.

In the method of manufacturing the polarization control device 110 that has been described with reference to FIG. 6A through FIG. 6D, a first electrode 80a having, for example, a mesh shape is disposed on the upper surface of a semiconductor wafer that includes an n-type region and a p-type region, and a second electrode 80b having, for example, a flat-plate shape is disposed on the lower surface, which allows for performing DPP annealing of the semiconductor wafer. A power supply 54 is connected to one portion of the first electrode 80a having a mesh shape and to one portion of the second electrode 80b having a flat-plate shape by wires 52 such that a forward current can flow throughout the entirety of the semiconductor wafer. The light irradiated in the DPP annealing is incident on the semiconductor wafer at the meshed portion of the first electrode 80a.

After the DPP annealing is carried out on the semiconductor wafer, the first electrode 80a and the second electrode 80b are removed, and a plurality of loop electrodes 20 are arrayed in the X direction and the Y direction on the upper surface of the semiconductor wafer, and the semiconductor wafer that includes the plurality of loop electrodes 20 may be divided into individual polarization control devices 110 by a processing such as dicing. In this way, the polarization control device 110 can be mass-produced.

Example of Method of Manufacturing

The semiconductor layer 10 shown in FIG. 5A was formed as follows. A n-type SiC buffer layer having a thickness of 500 nm was formed on an n-type 4H—SiC substrate (0001) of 25 mΩ cm, and a n-type SiC epitaxial layer having a thickness of 10 μm was formed on the n-type SiC buffer layer. The n-type impurity was nitrogen (N). The amount of N introduced as the dopant in the n-type 4H—SiC substrate (0001) was $1 \times 10^{18}$ cm$^{-3}$. The amount of N introduced as the dopant in the n-type SiC epitaxial layer was $1 \times 10^{16}$ cm$^{-3}$. By carrying out ion implantation of Al as the p-type impurity into a surface of the n-type SiC epitaxial layer, the surface of the n-type SiC epitaxial layer became a p-type SiC layer. The amount of Al introduced as the dopant in the p-type SiC layer was, for example, $1 \times 10^{19}$ cm$^{-3}$ in the vicinity of the pn junction 16. Annealing at 1800° C. for 5 minutes was carried out twice on the semiconductor layer 10 to activate the Al ion.

The lengths of the sides in the X direction and the Y direction of the semiconductor layer 10 shown in FIG. 5A were 3000 μm, and the thickness in the Z direction of the semiconductor layer 10 was 75 μm.

The loop electrode 20 shown in FIG. 5B had a multilayer structure consisting of a Cr layer having a thickness of 30 nm and a Au layer having a thickness of 700 nm. The inner diameter of the ring portion 20r of the loop electrode 20 was 1300 μm. The electrically-conductive member 40 shown in FIG. 5B had a multilayer structure consisting of a Cr layer having a thickness of 30 nm, a Pt layer having a thickness of 200 nm and a Au layer having a thickness of 700 nm. The inner diameter of the region surrounded by the edge of the opening 40o of the electrically-conductive member 40 was 2000 μm.

In the DPP annealing illustrated in FIG. 5C, the first conductivity type region 12 was irradiated for 40 minutes with light 62i, which was laser light having a wavelength of 405 nm and having a power of 20 mW, while a forward current was flowing with a current density of 2.2 A/cm$^2$.

In the example described above description above, the semiconductor layer 10 is 4H—SiC, the first conductivity type region 12 is a p-type semiconductor layer, and the second conductivity type region 14 is an n-type semiconductor layer. Meanwhile, the dopant species may be appropriately selected such that the first conductivity type region 12 is an n-type semiconductor layer and the second conductivity type region 14 is a p-type semiconductor layer. Alternatively, a semiconductor material other than 4H—SiC may be used, and the dopant species may be appropriately selected such that the first conductivity type region 12 is a p-type semiconductor layer or an n-type semiconductor layer.

A transmissive polarization control device, an optical isolator and a polarization variable light source according to the present disclosure are applicable to any appropriate optical device in which polarization control is performed.

It is to be understood that although certain embodiments of the present invention have been described, various other embodiments and variants may occur to those skilled in the art that are within the scope and spirit of the invention, and such other embodiments and variants are intended to be covered by the following claims

What is claimed is:

1. A transmissive polarization control device comprising:
a semiconductor layer having a first surface and a second surface opposite to the first surface, the semiconductor layer comprising:
a first conductivity type region having a conductivity type that is one of p-type and n-type,
a second conductivity type region having a conductivity type that is the other of p-type and n-type, and
a pn junction located between the first conductivity type region and the second conductivity type region;
a loop electrode disposed on the first surface and configured such that an electric current flowing through the loop produces a magnetic field in a direction penetrating the pn junction; and
a near-field light formation region in which an impurity of the first conductivity type introduced as a dopant into the first conductivity type region for formation of near-field light is distributed,
wherein a polarization direction of linearly polarized light traveling through a region surrounded by the loop electrode and the near-field light formation region is rotated according to the electric current.

2. The transmissive polarization control device of claim 1, wherein the pn junction is located closer to the first surface than to the second surface.

3. The transmissive polarization control device of claim 2, further comprising:
an electrically-conductive member on the second surface, the electrically-conductive member defining an opening,
wherein a region surrounded by an edge of the opening overlaps at least part of a region on the second surface that is immediately below the region surrounded by the loop electrode.

4. The transmissive polarization control device of claim 2, wherein:
the loop electrode comprises a ring portion defining a gap, and
a length of the gap is 25% or less of a length of the ring portion.

5. The transmissive polarization control device of claim 4 wherein, when viewed in a direction from the first surface toward the second surface, the region surrounded by the loop electrode overlaps the near-field light formation region.

6. An optical isolator comprising:
the transmissive polarization control device according to claim 4;
a driving circuit electrically connected to the loop electrode of the transmissive polarization control device, the driving circuit configured to change the electric current flowing through the loop electrode to modulate the magnetic field; and
a pair of polarizers comprising:
a first polarizer disposed on a light incident side of the transmissive polarization control device, and
a second polarizer disposed on a light emission side of the transmissive polarization control device,
wherein polarization directions of the first polarizer and the second polarizer are rotated at 45° with respect to each other.

7. A polarization variable light source comprising:
the optical isolator according to claim 6; and
a semiconductor laser device,
wherein a wavelength of light emitted from the semiconductor laser device is longer than a wavelength corresponding to an energy gap of a semiconductor material that forms the semiconductor layer.

8. The transmissive polarization control device of claim 1, further comprising:
an electrically-conductive member on the second surface, the electrically-conductive member defining an opening,
wherein a region surrounded by an edge of the opening overlaps at least part of a region on the second surface that is immediately below the region surrounded by the loop electrode.

9. The transmissive polarization control device of claim 1, wherein:
the loop electrode comprises a ring portion defining a gap, and
a length of the gap is 25% or less of a length of the ring portion.

10. The transmissive polarization control device of claim 9, wherein an inner diameter of the ring portion is 50 μm or more and 3000 μm or less.

11. The transmissive polarization control device of claim 1, wherein the loop electrode comprises a spiral conductor having one or more turns or a coil conductor having one or more turns.

12. The transmissive polarization control device of claim 1 wherein, when viewed in a direction from the first surface toward the second surface, the region surrounded by the loop electrode overlaps the near-field light formation region.

13. The transmissive polarization control device of claim 1, wherein the semiconductor layer is made of an indirect bandgap semiconductor material.

14. The transmissive polarization control device of claim 13, wherein the indirect bandgap semiconductor material is SiC.

15. The transmissive polarization control device of claim 1, wherein the semiconductor layer is made of a direct bandgap semiconductor material.

16. The transmissive polarization control device of claim 15, wherein the direct bandgap semiconductor material is ZnO.

17. The transmissive polarization control device of claim 1, wherein the loop electrode is made of a non-magnetic metal.

18. An optical isolator comprising:
the transmissive polarization control device according to claim 1;
a driving circuit electrically connected to the loop electrode of the transmissive polarization control device, the driving circuit configured to change the electric current flowing through the loop electrode to modulate the magnetic field; and
a pair of polarizers comprising:
a first polarizer disposed on a light incident side of the transmissive polarization control device, and
a second polarizer disposed on a light emission side of the transmissive polarization control device,
wherein polarization directions of the first polarizer and the second polarizer are rotated at 45° with respect to each other.

19. A polarization variable light source comprising:
the transmissive polarization control device according to claim 1; and
a semiconductor laser device,
wherein a wavelength of light emitted from the semiconductor laser device is longer than a wavelength corresponding to an energy gap of a semiconductor material that forms the semiconductor layer.

20. A manufacturing method of a transmissive polarization control device, comprising:
providing a semiconductor layer having a first surface and a second surface opposite to the first surface, a first electrode disposed on the first surface of the semiconductor layer, and a second electrode disposed on the second surface of the semiconductor layer, the semiconductor layer comprising:
  a first conductivity type region having a conductivity type that is one of p-type and n-type,
  a second conductivity type region having a conductivity type that is the other of p-type and n-type, and
  a pn junction located between the first conductivity type region and the second conductivity type region;
irradiating the semiconductor layer with laser light while a forward current flows between the first electrode and the second electrode, to form a near-field light formation region in which an impurity of the first conductivity type for formation of near-field light is distributed;
removing the first electrode and the second electrode; and
forming a loop electrode through which an electric current flows to produce a magnetic field in a direction penetrating the pn junction, the loop electrode disposed on the first surface.

* * * * *